United States Patent [19]
Gabriel

[11] Patent Number: 5,826,825
[45] Date of Patent: Oct. 27, 1998

[54] AUTOMATICALLY ACTUATED CARGO AND PERSONNEL SNATCHING APPARATUS WITH DISTANCE SENSOS, MAGNETS AND PIVOT PINS FOR ASSISTANCE

[76] Inventor: Edwin Zenith Gabriel, 91 Mt. Tabor Way, Ocean Grove, N.J. 07756

[21] Appl. No.: 712,591

[22] Filed: Sep. 13, 1996

Related U.S. Application Data

[63] Continuation-in-part of Ser. No. 289,744, Apr. 12, 1994, abandoned.

[51] Int. Cl.[6] ..................................................... B64D 9/00
[52] U.S. Cl. .................. 244/137.1; 294/118; 244/137.2; 244/137.4
[58] Field of Search ............................. 244/118.1, 118.5, 244/137.1, 137.2, 137.4; 441/87, 80, 83; 294/118, 99.1, 902; 5/81.1 R, 83.1, 638

[56] References Cited

U.S. PATENT DOCUMENTS

| | | | |
|---|---|---|---|
| 1,042,327 | 10/1912 | Costanzo | 441/87 |
| 3,294,346 | 12/1966 | Summers | 244/121 |
| 4,807,421 | 2/1989 | Araki et al. | 294/99.1 |
| 5,039,162 | 8/1991 | Yoshida | 244/141 |
| 5,104,169 | 4/1992 | Kapuski | 5/1.1 R |
| 5,209,538 | 5/1993 | Gabriel | 294/118 |

*Primary Examiner*—Galen Barefoot

[57] ABSTRACT

This apparatus is a simple, automatically-actuated load-lifting device, forceps-like in appearance, pivoted at a selected distance from the device's top. Its lower portions are vertical to enable it to hold a containerized load in place. This improvement reduces the work load of the pilot of a hovering helicopter, from which the apparatus is suspended, in locating and scooping up the load. The apparatus includes sensors for sensing the distance of the apparatus from the load, and when within range, automatically separating its lower portions, while the apparatus is in mid-air, so they will straddle the load's container. To assist the pilot in this endeavor, a miniature camera is also located on the apparatus over-seeing the area beneath, with the CRT monitor in the helicopter cockpit. Schemes are introduced for back-up positive load retention of the load, and for reliable scooping up of the load, using magnets for repulsion and attraction and a geared motor, remotely or automatically controlled.

18 Claims, 23 Drawing Sheets

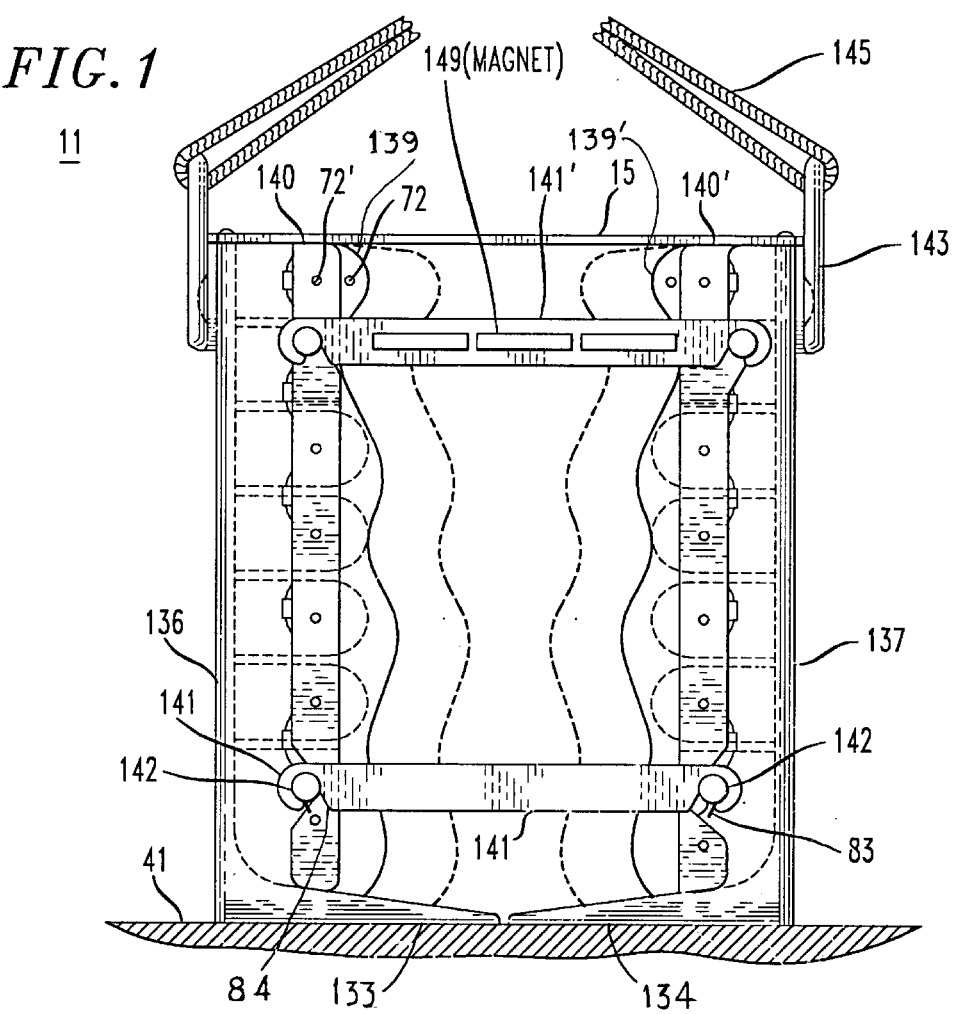
FIG.1
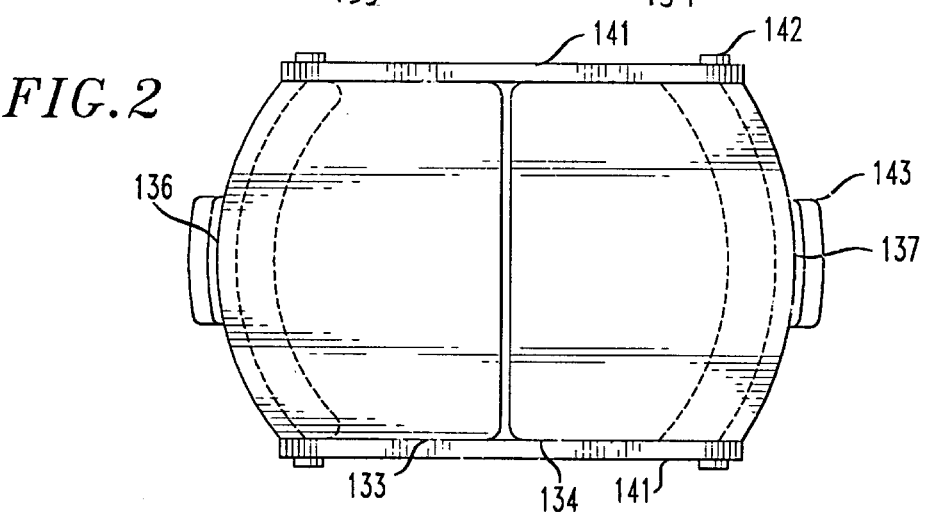
FIG.2
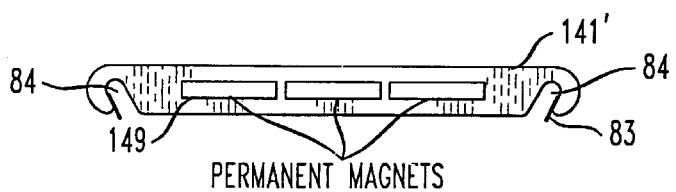
FIG.3  PERMANENT MAGNETS

FIG. 4
FIG. 5
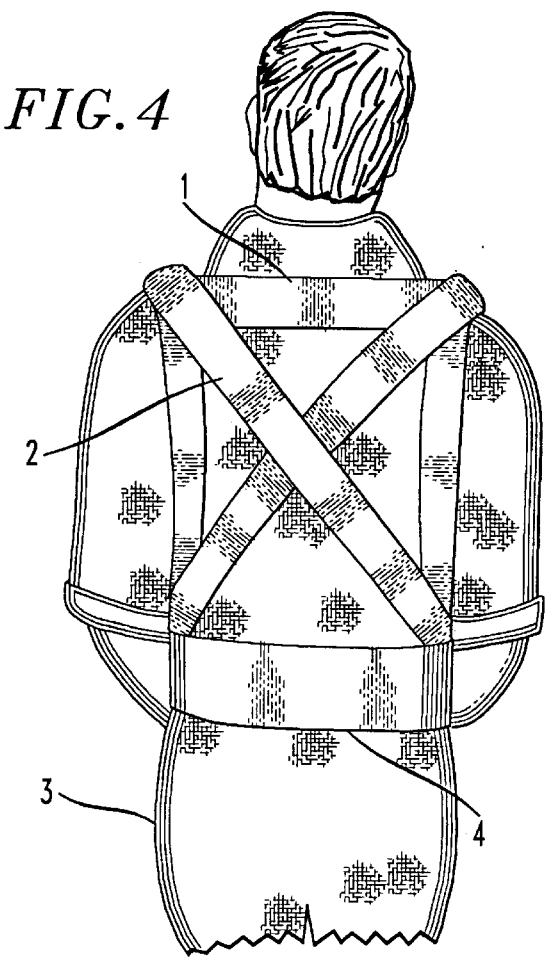
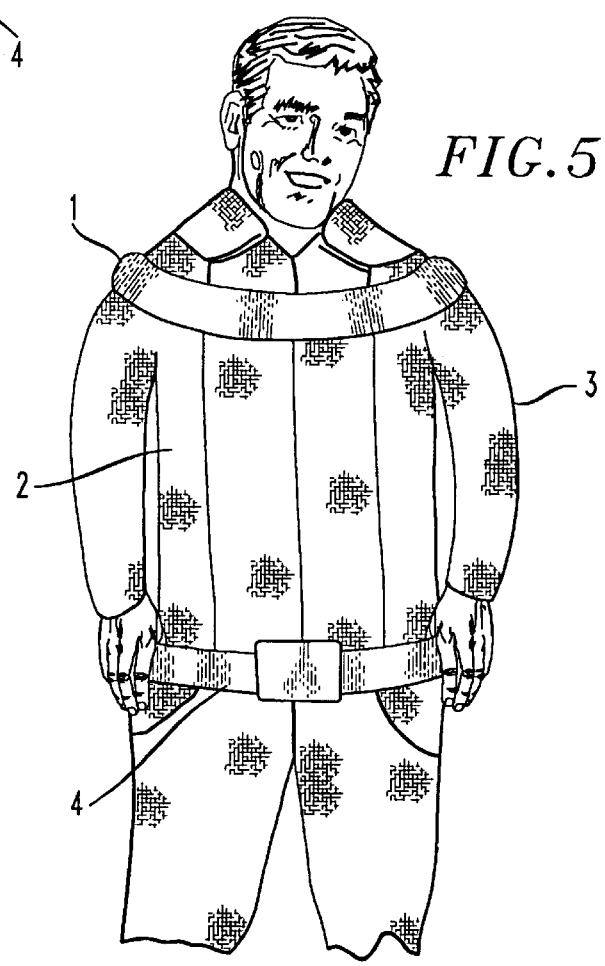

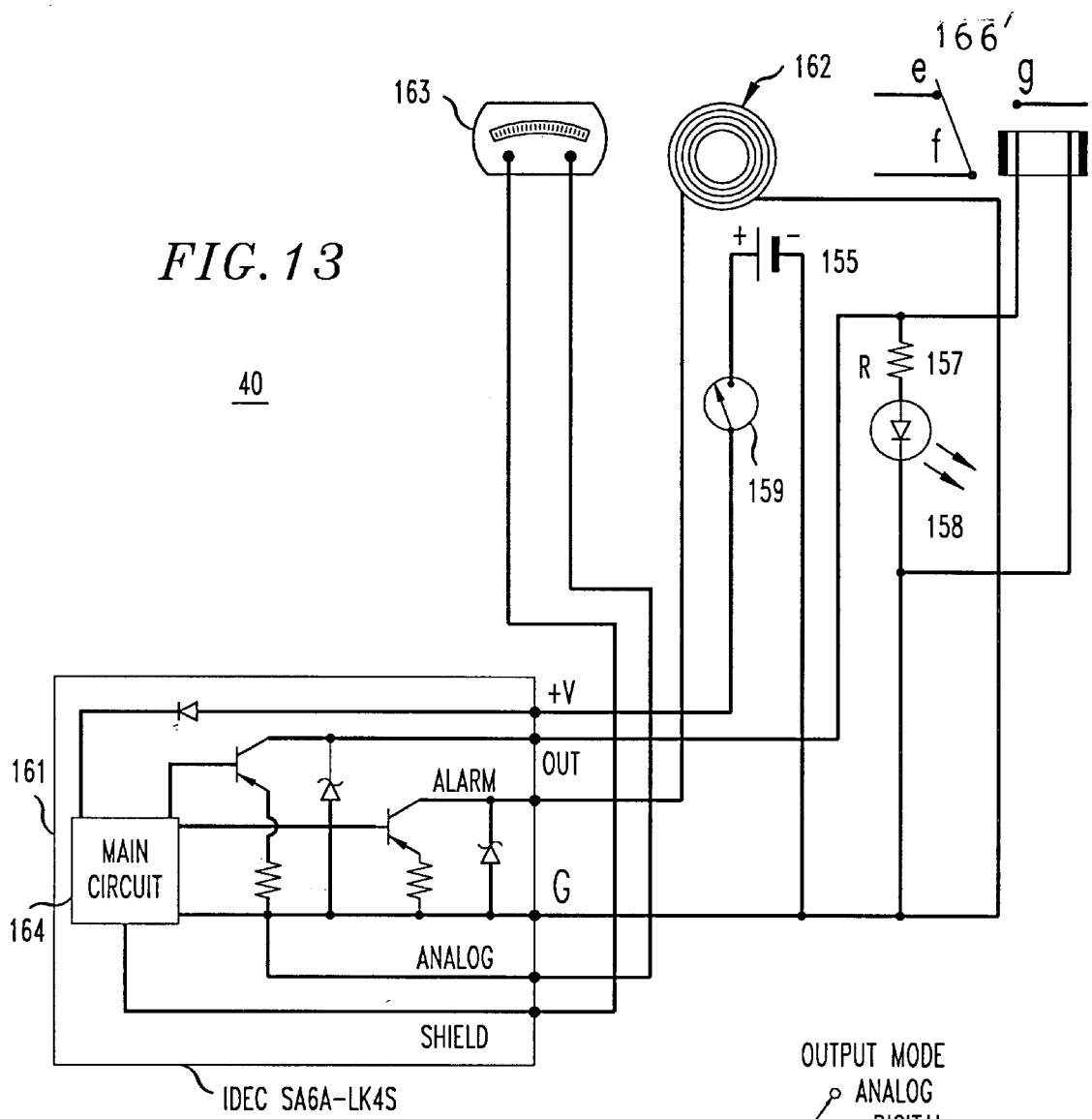

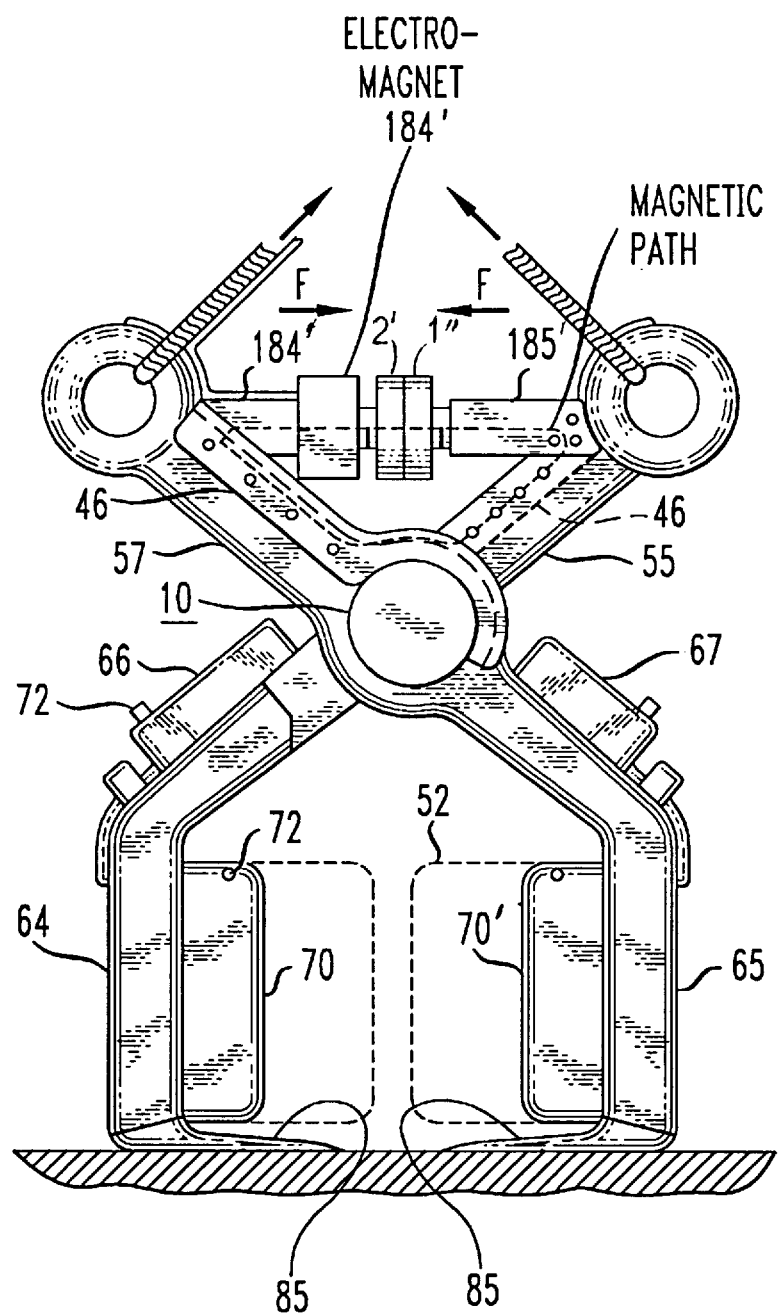

ASSEMBLY OF THE ABOVE
(FIGS. 34 TO 39)

FIG.47
FIG.48
FIG.51
FIG.50
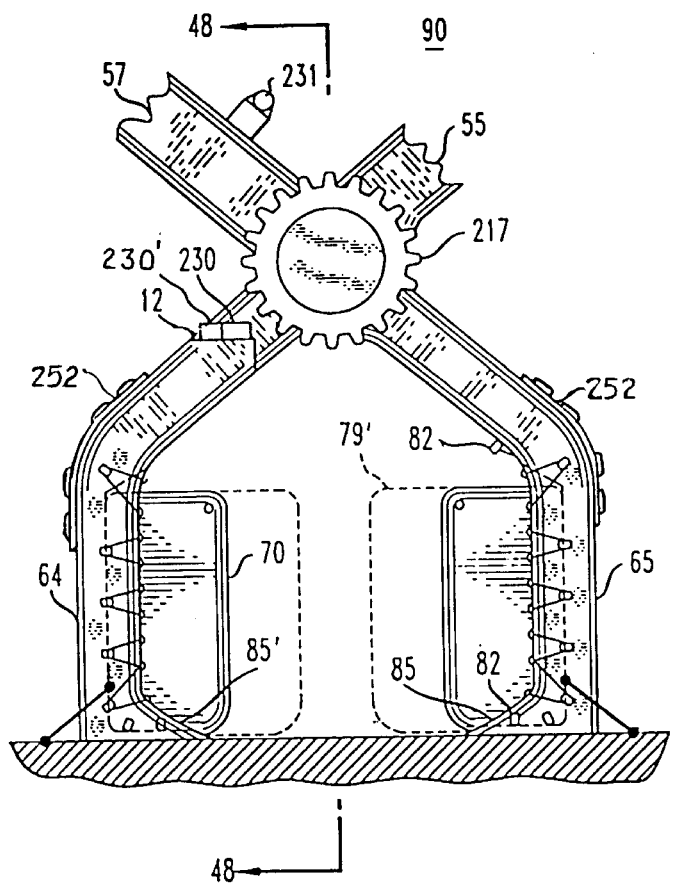
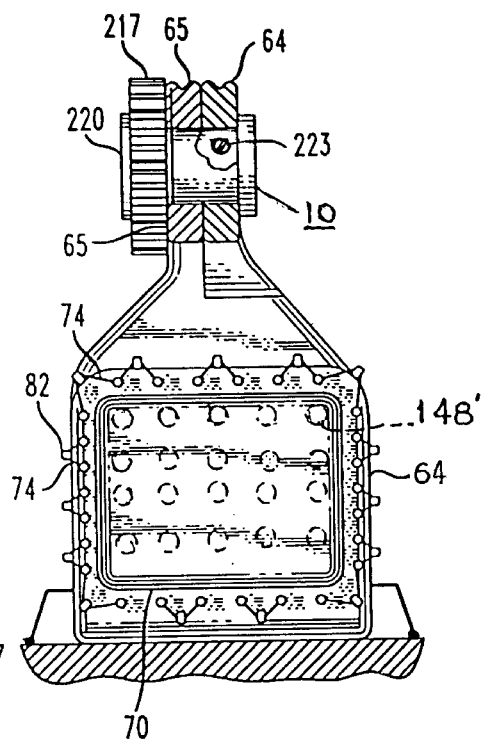
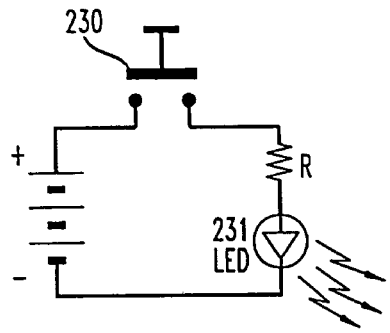
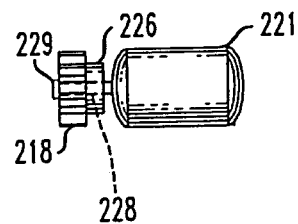

AUTOMATICALLY ACTUATED CARGO AND PERSONNEL SNATCHING APPARATUS WITH DISTANCE SENSOS, MAGNETS AND PIVOT PINS FOR ASSISTANCE

BACKGROUND OF THE INVENTION

This specification is a continuation-in-part of my application Ser. No. 08/289,744, filed Aug. 12, 1994, now abandoned.

This invention is in the field of material handling, utilizing helicopters as one means of supporting and helping perform the load lifting and releasing operations. A previous U.S. Pat. No. 5,209,538 dated May 11, 1993, also describes such a load-lifting apparatus. This invention which includes sensors and displays has improvements which enable the cargo snatching operation to be more automatic and more certain, thus reducing the pilot's workload considerably. Additional back-up load retention techniques are offered which are inexpensive and lightweight. Another previous U.S. Pat. No. 4,678,220, dated Jul. 7, 1987, by Gabriel, also describes a similar apparatus for loading and unloading containerized cargo. The automatic and other features are lacking in the above patent, existing in this apparatus. This disclosure with illustrations describes how the task can be performed more precisely and with less possibility of the apparatus causing any injury or damage to the load. To assist in obtaining this goal, the extensions at the bottom of the lower portions would have resilient, flexible projecting extensions and have resilient material fastened to the lower exteriors of the two lower portions, which could help stabilize the apparatus when resting on a platform. The material could be rigid replaceable packing foam. Other than the above, no such cargo handling apparatus is known to the applicant having the improvements for precisely grabbing a load, without damaging the load.

This patent application was submitted initially as Document Disclosures to the Patent Office on Nov. 15, 1993, No. 343,186; and on Mar. 19, 1994, No. 350,721 with 25 sheets of drawings and 18 claims. Gabriel's U.S. Pat. No. 5,209,538 was issued May 11, 1993. Thus, both Disclosures were submitted less than a year from the issuance of U.S. Pat. No. 5,209,538.

All Document Disclosures noted and U.S. Pat. No. 5,209,538 are solely owned by the present inventor.

SUMMARY OF THE INVENTION

This is a multi-purpose cargo personnel lifting apparatus with automatic loading and unloading capability, suspended from either a derrick or a helicopter.

Because of its ability to scoop up the entire load automatically and remotely without the aid of ground personnel, this apparatus, and modifications thereof, could be of much assistance to the military for rescue missions of incapacitated personnel on the battlefield, or in rough seas, from roofs of burning buildings or from areas to which a poisonous gas may have been emitted. Thus, with modifications and additions it can have many uses, including catching fish off a fishing pier.

This apparatus with appropriate sensors and a camera has the ability to locate cargo or personnel, to scoop up the load and provide secure positive-load-retention until it is safely delivered to a desired site, with the cooperation of the helicopter pilot. The load can be scooped up remotely with the aid of distance-measuring and actuation sensors and a CRT monitor in the helicopter cockpit. No assistance from ground personnel or action by the person being rescued would be required in the rescuing effort.

To be more specific, to assist in the automatic scooping operation, sensors are provided centrally, one near the bottom of each lower portion, to assist in having the lower portions separated as the apparatus approaches the load. After scooping up the load, in one version, the polarity of one electromagnet is changed to assist in the lower portions staying together, and thus providing positive-load-retention. Meanwhile, the pilot is being provided a display on his CRT screen as to what is going on at the site below in the scooping operation, via a miniature camera installed on the apparatus.

Other techniques are offered for keeping a rescued person or a retrieved load securely in place within the apparatus' chamber.

As in the previous U.S. Pat. No. 5,209,538, this apparatus comprises two elongated members, somewhat curved toward each other at their bottoms, and pivoted near their tops. This apparatus has hammerheads extending inward from its inside upper portions, positioned to receive all of the horizontal stresses imposed, so that no horizontal stresses need be borne by its lower portions, unless so desired. Because of the apparatus' distribution of weight, with weights on top and with the possible assistance of an extension coil spring, the device's lower and upper portions close automatically when tension is applied to the hoist cable, upon cargo lift-off. In this invention, the bars supporting the hammerheads are converted to electromagnets by insulated coils wound around them. To assist in the automatic scooping operation, sensors are provided centrally, one near the bottom of each lower portion, to assist in having the lower portions separated as the apparatus approaches the load. After scooping up the load, the electromagnets, by changing the polarity of one electromagnet, assist in the lower portions staying together, and providing positive-load-retention. Meanwhile, the pilot is being provided a display on his CRT screen as to what is going on at the site below in the scooping operation, via a miniature camera installed on the apparatus.

Techniques are offered for keeping a rescued person securely held within the apparatus' chamber.

BRIEF DESCRIPTION OF DRAWINGS

For the purpose of illustrating the additional back-up positive-load-retention features of the invention of the Apparatus, U.S. Pat. No. 5,209,538, the following drawings show forms which are presently preferred. It is understood, however, that this invention is not necessarily limited to the precise arrangement, instrumentalities and field of utility as therein demonstrated.

FIG. 1 is a front view assembly of the apparatus without the upper portions and without the pivot pin. It has the appearance of an elongated basket. Either hoist cables are attached at its top end, or a rotor and engine may be attached, though not shown. The two lower portions are held together by cross-piece members or bars. Both members are used when hoist cables are used. When the compartments of the inside pillows are inflated, with sufficient pressure, some of the compartments inflated could bulge into the inside pillows, as shown by dashed lines. However, instead of inflatable pillows, perforated, noninflatable cushions may be substituted for simplification.

FIG. 2 is a bottom view of the assembly, showing the two bottom extensions or projections making approximately contact with each other.

FIG. 3 shows the cross-bars front view with imbedded permanent magnets.

FIG. 4 shows the back view of a harness worn by a person showing a cross member across his shoulders, with a ferrous metal outer surface, selectively placed.

FIG. 5 shows the front view of the harness worn by the same individual with the same cross-member along his upper front area.

FIG. 13 shows schematic of ultrasonic sensor including distance indicator meter and alarm.

FIG. 14 shows block diagrams of the ultrasonic distance sensor, transmitter, oscillator, receiver and the containerized load to be sensed.

FIG. 29 is a front view of the cargo lifting apparatus with ferrous metal reenforcements in its upper portions for conducting magnetic lines of force, if desirable.

FIG. 39 is the other half of miniature motor and disk support with another pivot hole, aligning with pivot hole of the first half for a bolt to pass through.

FIG. 47 shows the front view of essentially the same apparatus as FIG. 45 but without the pinion gear. A LED and push button switch are added to indicate to the pilot that maximum separation of the lower portions has been achieved.

FIG. 48 is a side view thereof.

FIG. 50 is a detail drawing of the motor and pinion gear, frictionally attached to motor shaft.

FIG. 51 is a circuit diagram of the push button switch, LED.

BRIEF DESCRIPTION OF THE DIFFERENT VERSIONS OF THE APPARATUS

Figure 12:
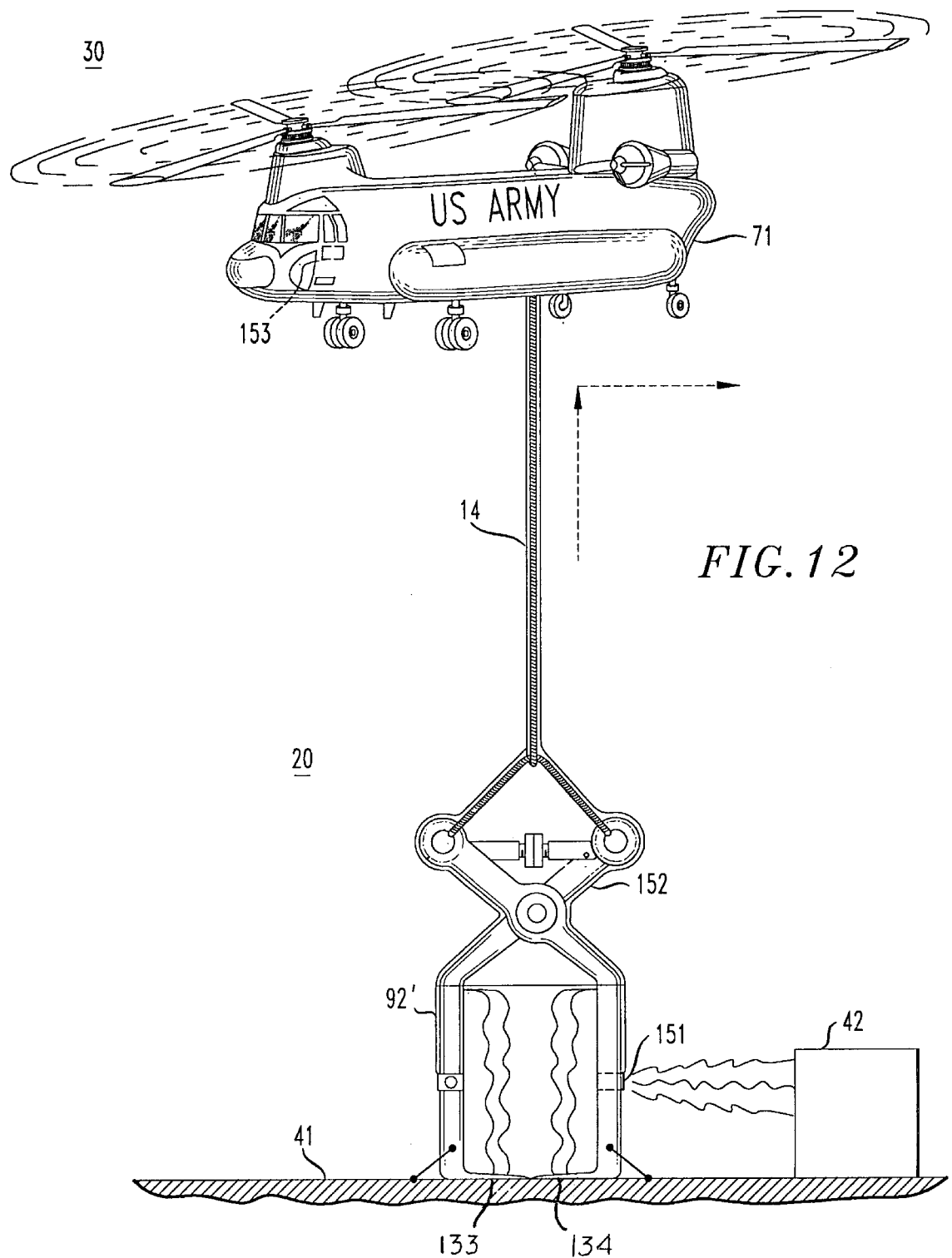
FIG. 12 shows the apparatus suspended from helicopter; apparatus has LED sensor sensing load.
Figure 15:
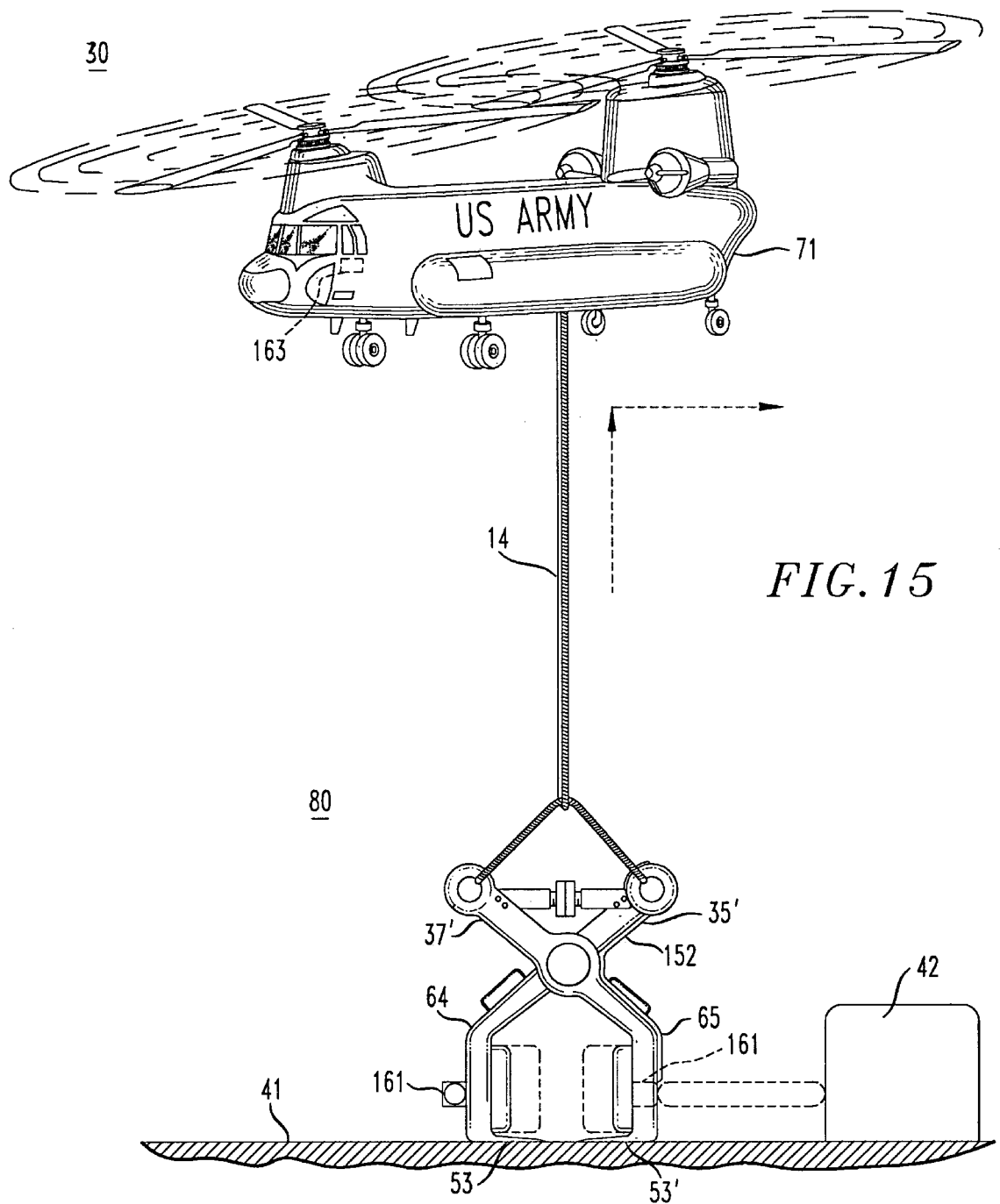
FIG. 15 shows the apparatus with ultrasonic distance sensor sensing a load horizontally, the apparatus being supported by the ground and by hoist cable dangling from the helicopter.
Figure 16:
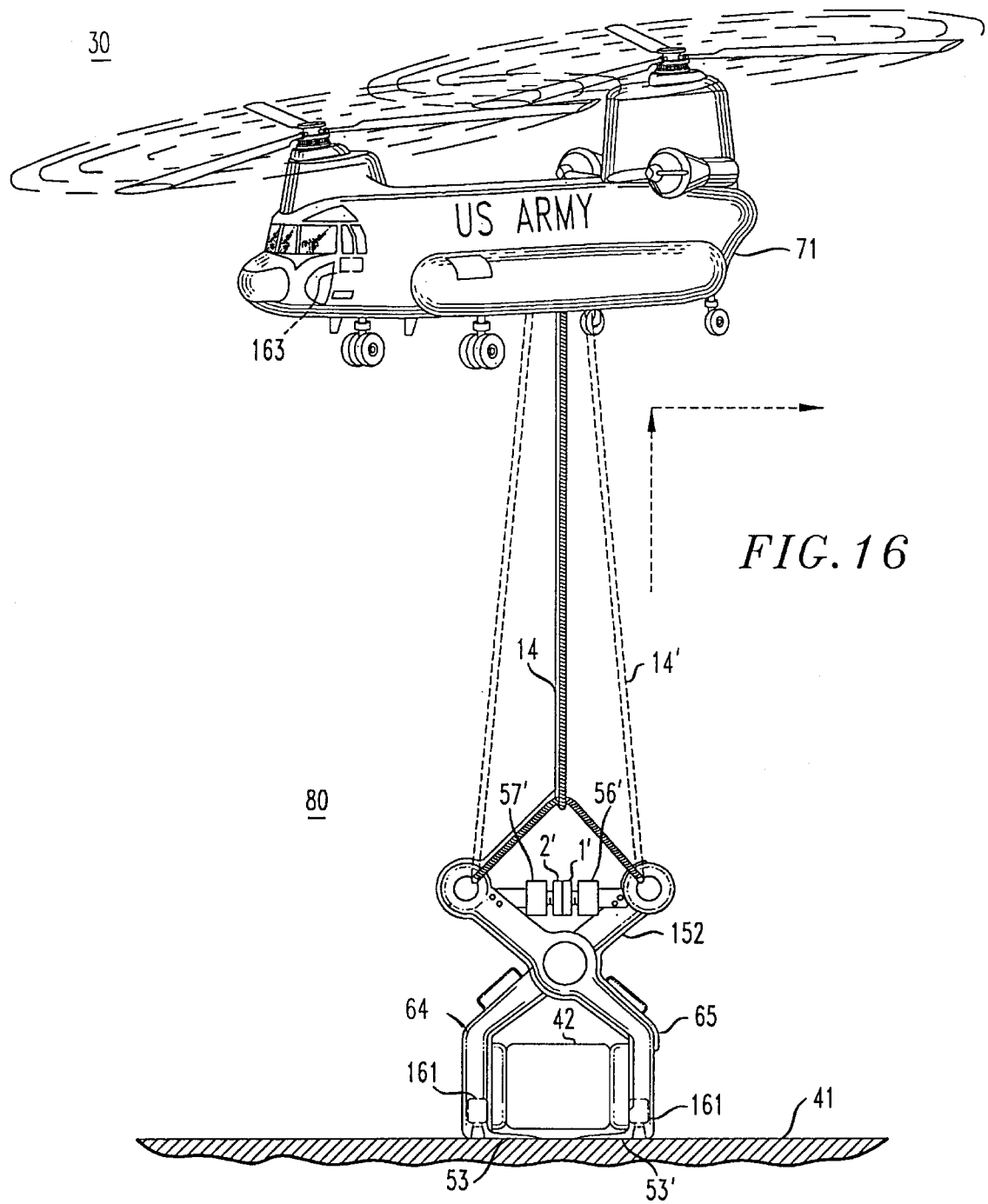
FIG. 16 shows apparatus scooped up and still supported partially by the ground.

At the outset, to clarify the differences between the various versions of the apparatus suspended from helicopters, the following descriptions are provided:

1. Elongated apparatus 20, capable of scooping and supporting a person is shown in FIG. 12. Apparatus 20 is suspended from helicopter 30 and is provided with analog distance sensor 151 with a laser beam being emitted from within the unit. Load 42 is adjacent to apparatus 20.
2. Apparatus 80, capable of scooping up cargo, is suspended from helicopter 60, and is shown in FIG. 15. Apparatus 80 is provide with ultrasonic sensors 161. Again load 42 is adjacent to the apparatus.
3. In FIG. 16, apparatus 80 is gripping load 42.

Figure 17:
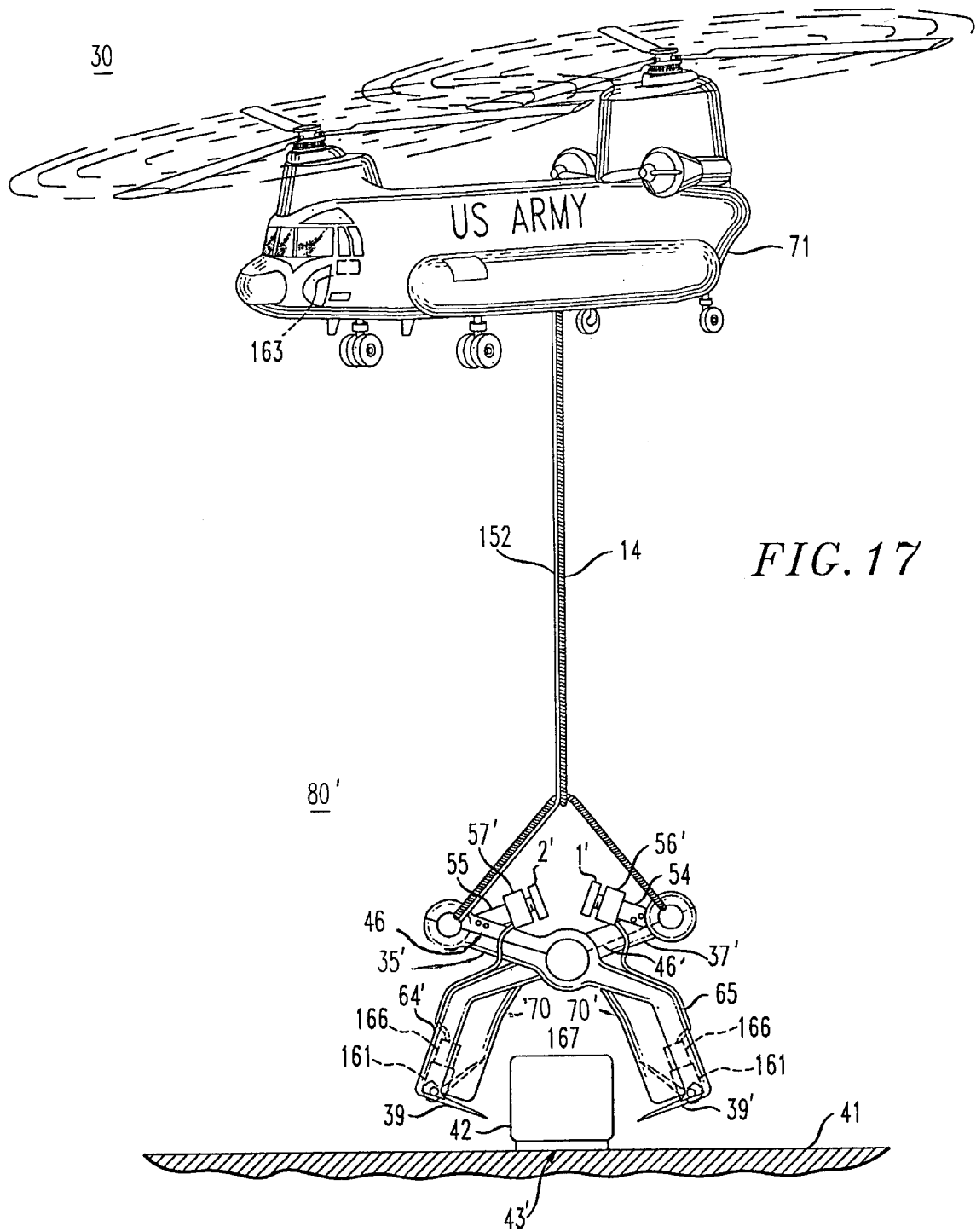
FIG. 17 shows disengaged apparatus suspended from helicopter by hoist cable. Apparatus and load are ready to be scooped up by the cable.

In FIG. 17, apparatus 80 is suspended by helicopter 60 and could have its lower portions separated to either converge on load 42 and have its extensions 39 and 39' grip its underneath or its lower portions have just released load 42 and is about to be hoisted upward. Apparatus 80 is equipped with ultrasonic distance sensors 161.

Figure 18:
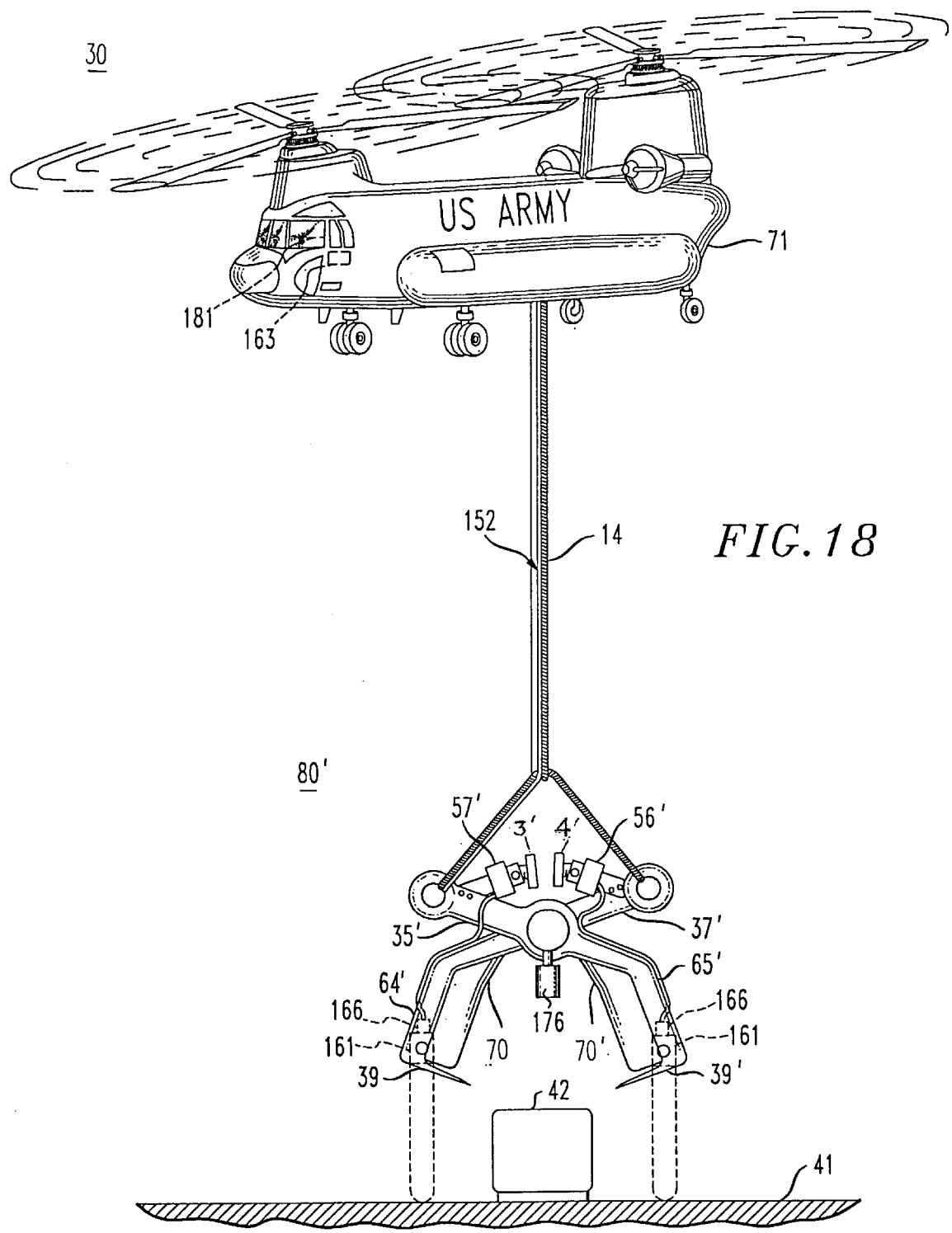
FIG. 18 shows a suspended apparatus with two ultrasonic sensors located at the feet of its lower portions.
Figures 19, 20:
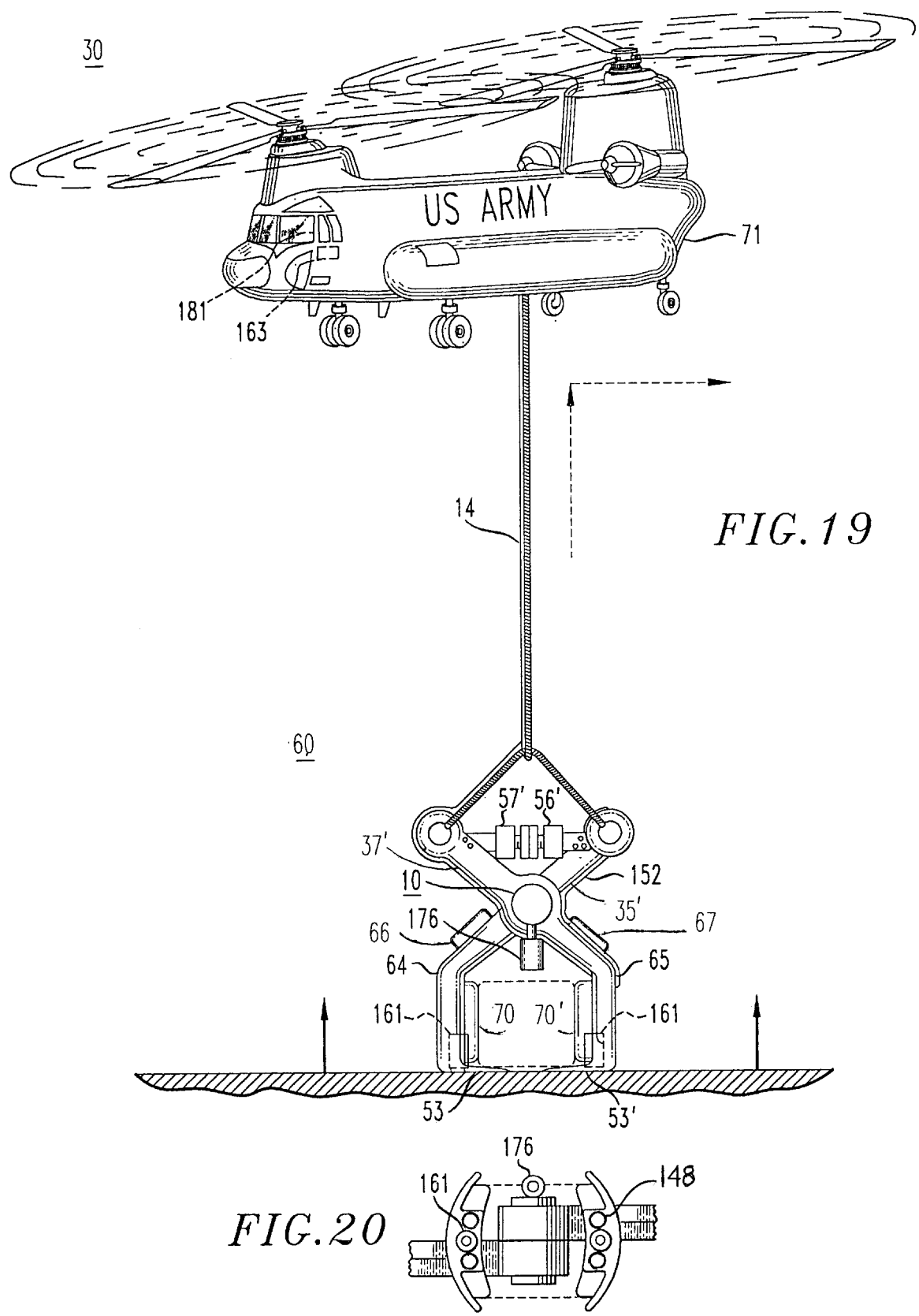
FIG. 19 shows the load engaging apparatus ready to be lifted by the hoist cable suspended from a helicopter.
FIG. 20 shows a bottom view of the apparatus and two ultrasonic sensors visible through holes in the bottom extensions.
Figure 30:
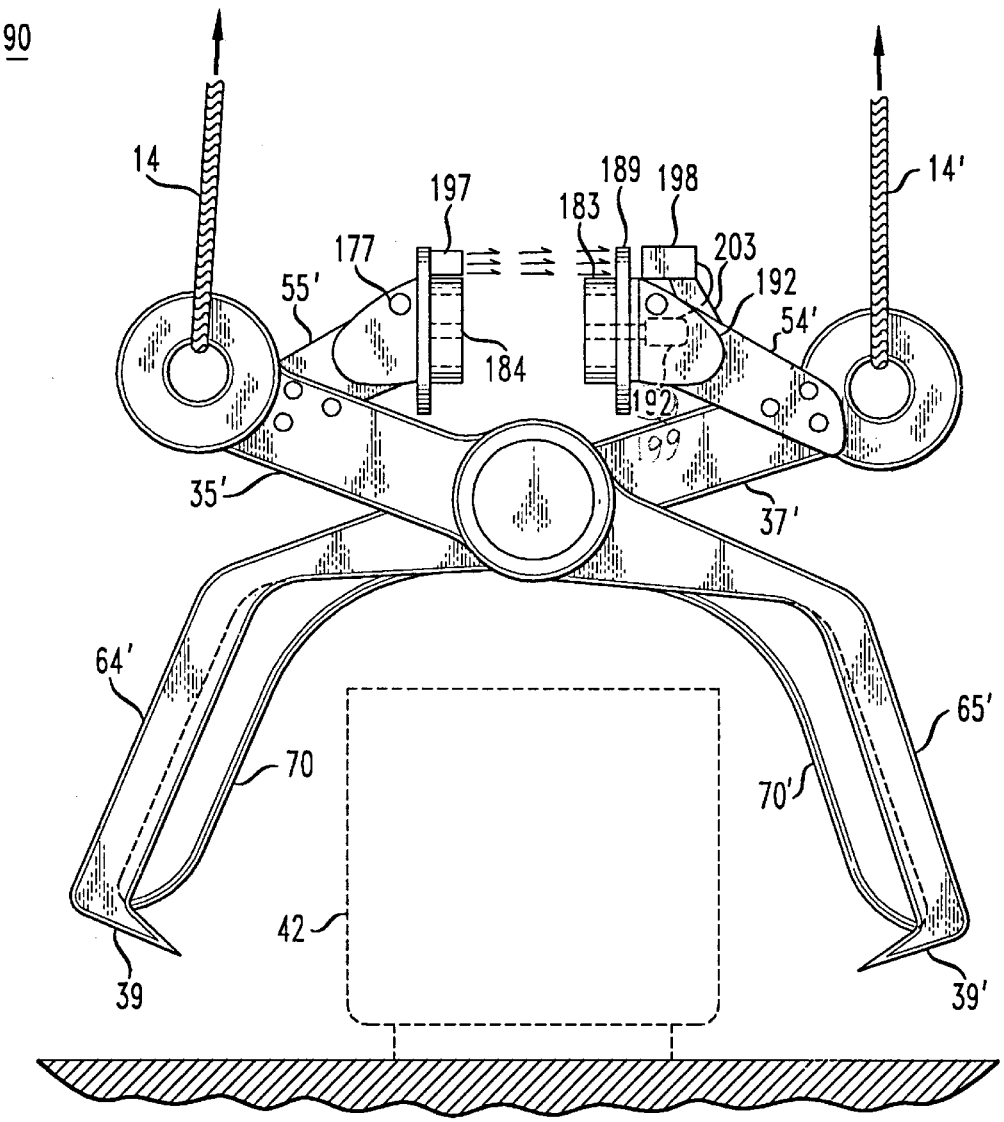
FIG. 30 is a front view of the apparatus with its lower and upper portions separated in order to scoop up cargo. Pivoted hammerheads are shown directly above the pivoted portions' center of gravity, so that the faces of the two hammerheads are always parallel to each other.
Figure 34:
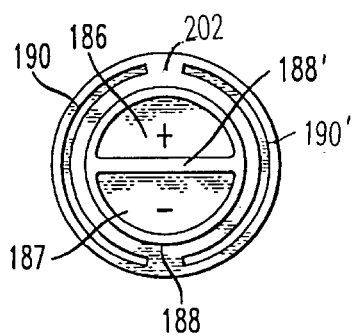
FIG. 34 is a front view of a disk and hub showing the two circular slots.
Figure 52:
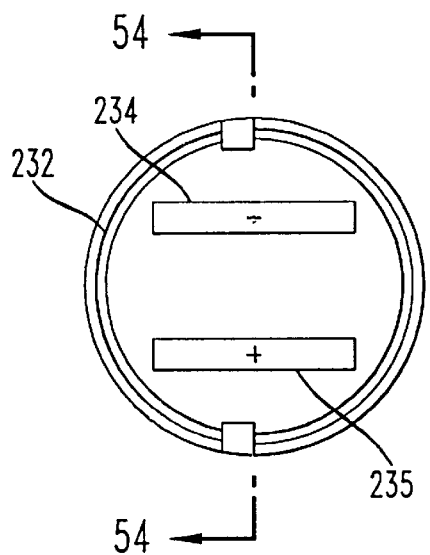
FIG. 52 is the front view of an off-the-shelf magnetic assembly showing a negative pole and a positive pole.
Figure 53:
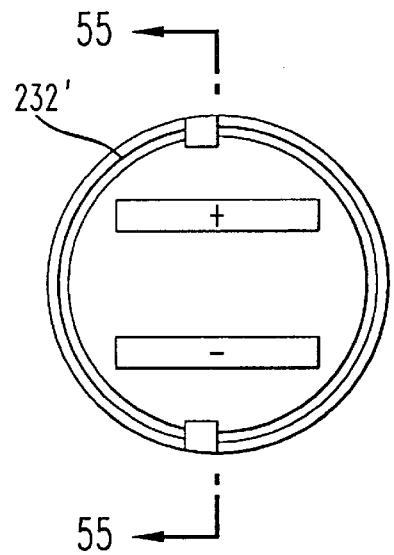
FIG. 53 is the same magnetic assembly rotated 180°.

4. In FIG. 18, apparatus 80 is being lowered onto platform 41 in order to scoop up load 42. Alike polarity magnets repel and cause lower portions 64', 65', to remain separated.
5. In FIG. 19, apparatus 80 is gripping cargo 42 and a wide-angle lens camera 176 has been added to assist the helicopter pilot in locating the cargo. Electromagnets 56', 57', attract each other when their polarities are unlike. Apparatus 80 is still equipped with ultrasonic sensors 161.
6. In FIG. 30, apparatus 90 is similar to apparatus 80, and may be equipped with ultrasonic sensors 161, except now permanent magnets 183 are provided and can rotate 180° to produce attraction or repulsion with opposing magnet assembly 184. These bipolar magnet assemblies are shown in FIGS. 34, 52 and 53.

Figure 45:
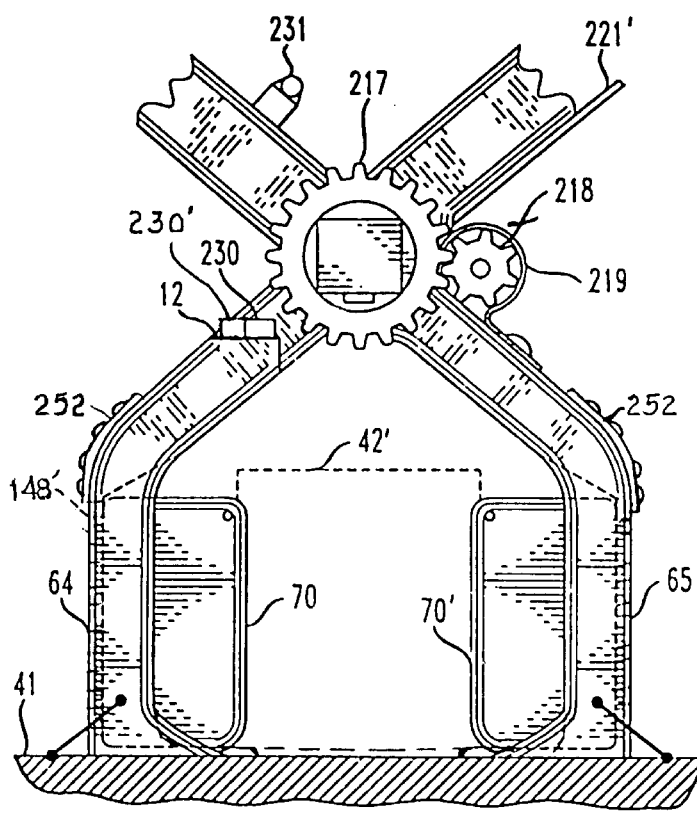
FIG. 45 shows the front view of the apparatus in which a large spur gear is rotated by a pinion gear to spread apart its lower portions the maximum amount in order to straddle the containerized cargo.

In FIG. 45, apparatus 100 has a different actuation system for separating its lower portions when wanting to scoop up a load. A motorized pinion gear meshes with a spur gear to either separate its lower portions or to cause them to come together, as shown in FIG. 45.

DESCRIPTION OF A PREFERRED EMBODIMENT

An embodiment of a load-lifting apparatus 11 is portrayed in assembly drawing, FIG. 1. In FIG. 1, cross members 141 and 141' prevent lower portions 136 and 137 from separating. Cable 145 and cable supports 143 provide means for suspending apparatus 11 from a helicopter. For comfortably supporting a person, compartmentalized air-inflated pillows 140, 140' are provided, while 72, 72' are their air valves. Extensions or projections 133 and 134 help keep lower portions apart. Crossbars 141 and 141' are supported by knobs 142 and leaf spring 83 at slot 84, preventing bars from coming off of knob 142.

Figure 6:
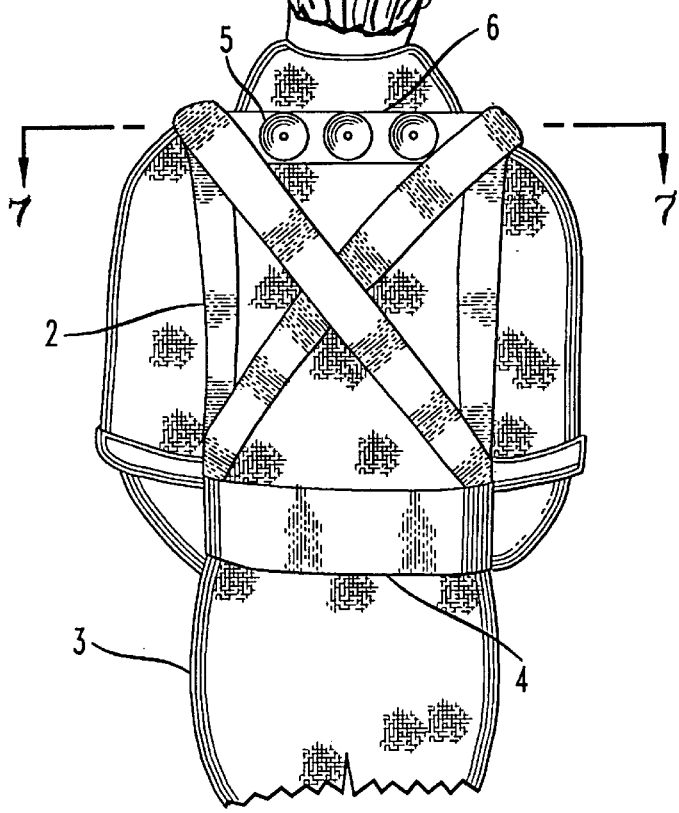
FIG. 6 shows the back view of another harness with suction cups attached to the cross member across his shoulders, so the cups can make contact with cross-member 141', FIG. 1, as shown in FIG. 9.
Figure 8:
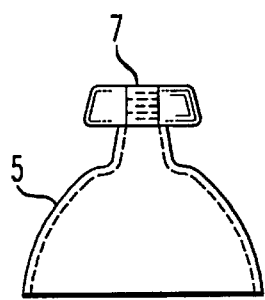
FIG. 8 shows the top view of an enlarged plastic, rubbery suction cup.
Figure 7:
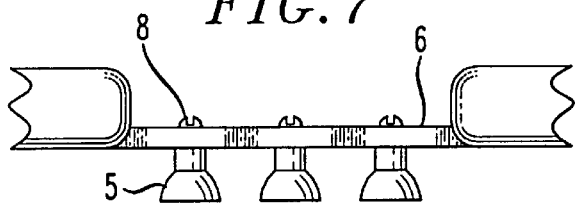
FIG. 7 shows a partial top view of the cross member with the suction cups attached, section along Line 7—7, FIG. 6.
Figure 9:
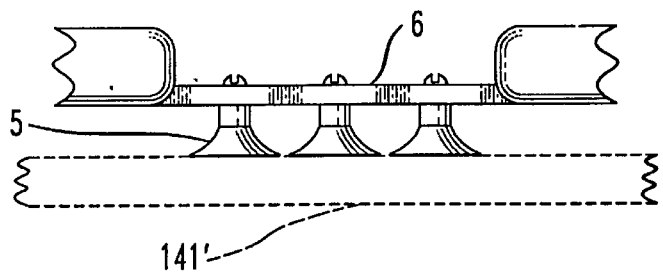
FIG. 9 shows the suction cups of cross-member of harness or lumbar support making contact with cross-piece member of the apparatus FIG. 1.

In the configuration of apparatus 11, FIG. 1, lower portions 136 and 137 need not completely separate as crossbeam 15 at top is bendable. A person within the enclosure could exit from the apparatus as soon as either crossbar 141 or 141' is removed. An additional back-up load-retention scheme for preventing portions 136 and 137, FIG. 1, from separating and to ensure that the person within the enclosure will not fall out of the apparatus is to provide suction cups 5 on the back-strap 6 of a harness worn by person 3, FIG. 6. When the person is standing up within the enclosure of apparatus 11, FIG. 1, the suction cups would engage with the inside surface of cross member 141', providing additional positive-load-retention for the individual. Lips 10', FIG. 8, are provided to allow suction cups 5, FIG. 8, to be freed from board 141'. Inside surface of bar 141' is very smooth. Pillows 139 and 139' embrace the person within that enclosure.

Instead of suction cups 5 to provide additional positive load retention, permanent magnets 149, FIG. 3, inserted in bar 141', FIG. 1, and a selectively placed ferrous sheet metal covering or metal portions, in back of cross-support 1, is provided. Cross-members 2 also may have ferrous sheet metal. When a person stands inside of apparatus 11, the person's back rests against bar 141' and permanent magnets 149 make contact with the sheet-metal covering of cross-support 1, FIG. 4. To free himself from magnets 149, he simply unbuckles his harness, or lumbar support and walks out. Bendable beam 15, fastened to the top of apparatus 11, helps assure keeping portions 136 and 137 together. Magnets 149 are considered back-up means for holding person 3, FIGS. 4, 5, in place.

Another Preferred Embodiment Using an Analog Distance Sensor

The apparatus 20, FIG. 12, described and illustrated in U.S. Pat. No. 5,209,538 is usually suspended from a helicopter 30, and is designed to either carry a person or a containerized load from one site to another site. If it is to be placed adjacent to some other object, the pilot would like to know just how close the apparatus is to the other object, before unloading a containerized load. He may wish to know within the distance of less than a foot. In this application the apparatus is shown in FIG. 12.

Unlike apparatus 11, FIG. 1, apparatus 20 has upper portions, as well as lower portions 154, 154' and pivot pin 10. Pin 10 connects the two elongated portions together, as shown, allowing the two members to swing about pin 10, so both upper and lower portions can spread apart or come together, as shown in FIGS. 16 and 17. Hammerheads at their upper portions take the brunt of the horizontal forces, when its two lower positions come together.

A technique is described here that enables a pilot sitting in the pilot's set to be informed remotely, with the aid of an analog distance sensor 151 (SA1D), the apparatus' proximity to another object. The remote distance indicator 153 in his cockpit tells him, when the distance is from 8 inches to 20 inches, approximately.

The pilot, guided by his co-pilot, could have the apparatus come within a few feet of the object 42, while the helicopter is in a hovering mode. It is the final foot of distance from object 42, that analog sensor 151 could provide assistance. A helicopter with state-of-the-art stability augmentation can hover within a foot or less of an object, and sensor meter 153 would assist the pilot in this regard.

Alarm 156, a Mallory Sonalert type SC12, turns on, along with alarm LED indicator on sensor, when sensing conditions may result in inaccurate sensing, such as when sensor head is dirty or when there is insufficient reflected light from the object. LED 158 also notifies pilot that the SA1D is within sensor range of object 42.

SA1D is manufactured by IDEC Corporation, Sunnyvale, Calif. 94089-2211.

Another Preferred Embodiment for Remotely Positioning of Apparatus

Apparatus 80 described and illustrated in U.S. Pat. No. 5,209,538, is preferably suspended from a helicopter, such as 30, and is designed either to scoop up a person or a containerized load and carry the load from one site to another desirable location.

If the apparatus is to be placed adjacent to or over another object 42, FIG. 15, the pilot in the helicopter would like to know how close the apparatus is to object 42, before either unloading a containerized load or scooping up load 42. The pilot would like to know if apparatus 80 is approaching load 42 and exactly how close apparatus 80 suspended from helicopter 30, is to load 42 in inches.

A technique is described here that enables a pilot sitting in the cockpit to be informed remotely of the distance the apparatus is from load 42 with the aid of an ultrasonic analog distance sensor IDEC SA6A 161, remotely placed distance indicator 163, FIG. 15, in his cockpit tells him when the distance is from 8 inches to 40 inches.

The pilot, perhaps guided by his co-pilot, could have apparatus 80, FIG. 15, come within a few feet of object 42, while the helicopter is in hovering mode.

It is the final two, or three feet of distance from object 42 that sensor 161 could provide assistance. A helicopter with state-of-the-art stability augmentation can hover within a foot of an object under favorable conditions. Sensor 161 would assist the pilot in coming as close as desirable to object 42, within the sensor's accuracy. Relay 166, FIGS. 17, 18, controls the polarity of electromagnets 56', 57'.

Figures 10, 11:
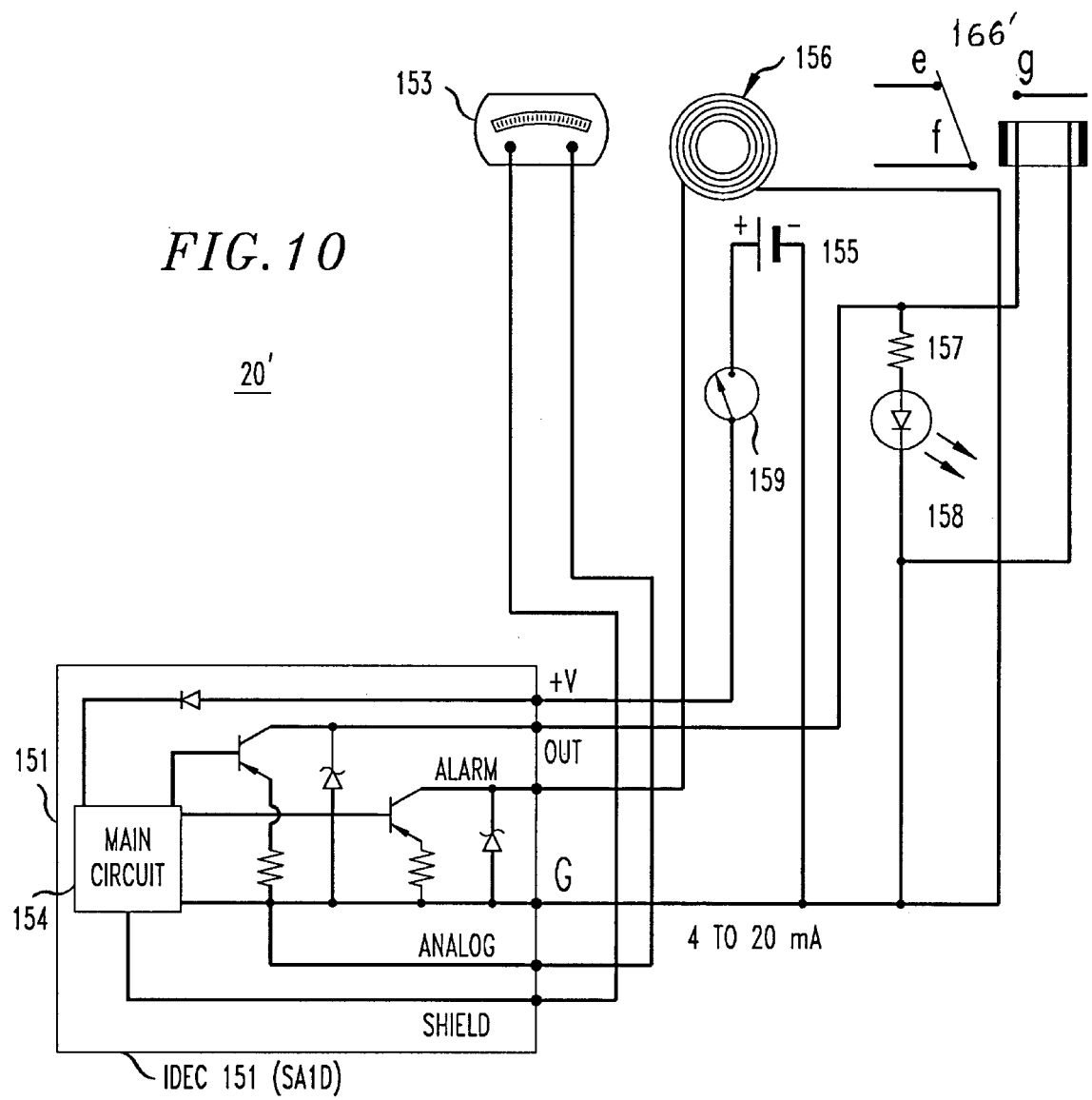
FIG. 10 shows schematic of LED sensor and physical sketches of distance indicator meter, alarm relay.
FIG. 11 shows the hardware LED distance sensor pointing to objects A and B.

In FIG. 10, alarm 156, a Mallory Sonalert type SC12 turns on, along with alarm LED indicator on ultrasonic sensor 161, SA6A by IDEC, when alarm output is on. In fuzzy mode, alarm occurs with excessive temperature, above 60° C., fluctuations. In hold mode, alarm occurs when 3 invalid signals are detected within 3 seconds. Alarm also sounds when sensor head is dirty or reflected sound waves are insufficient. When alarm sounds, the digital output and OUT indicator are turned off simultaneously. Ultrasonic sensing of nonreflective, transparent, liquid or special objects is possible. When the object material tends to absorb ultrasonic signal, the sensing range may be reduced. The SA6A ultrasonic analog distance sensor is manufactured by IDEC Corporation, Sunnyvale, Calif. 94089-2211. Flanges 46, 46', FIG. 17, are similar to flanges FIG. 28A, and are soft steel or iron to enable a closed magnetic loop to occur. Cushions 70 and 70' are for embracing load 42.

Description of Preferred Embodiment Using an Ultrasonic Distance Sensor

It is desirable to have apparatus 80', FIG. 18, perform some additional automatic operations in order to readily scoop up load 42 with less effort on the part of the ones operating the hoist equipment and the helicopter. Hence, it would be less of a work load on the part of the pilot or co-pilot to just lower apparatus 80' over to the top of load 42, while watching the scene below on a CRT screen. As apparatus 80' comes within the distance sensed by either sensor 151 or 161, the lower portions of the apparatus automatically separate, so they can straddle load 42, when the apparatus is lowered further. FIG. 18 shows ultrasonic sensor 161, and cushions 70, 70' for embracing load 42.

When bottom inwardly projecting extensions 39, 39' of apparatus make contact with surface 41, hoist cable 14, FIG. 17, slackens and lower portions 64' and 65' open and separate even more, because of weights 9 on top of the upper portions. The sharp edges of ends of extensions 39, 39' should get underneath cargo and scoop it up. As cable 14 is pulled up, end of bottom extensions will come together. If the top surfaces of extensions 39, 39' are oiled or greased and cargo 42 is placed on a riser 43', a FIG. 17, scooping up load 42 would be made easier. Bottom extensions 39, 39', are shown pivoted at pins 165 to increase separation distance. Extensions may have imbedded magnets 148, FIG. 20, to aid in retaining load 42, FIGS. 16 and 45. Top surfaces of the extensions may be of resilient friction material for supplemental load retention.

To enable apparatus 80 or 80', FIGS. 16, 17, 18, 19, to perform as described above, sensing instrumentation has been added. Bars 54, 55, have electromagnets 56' and 57' added. To cause hammerheads 1' and 2' to separate, polarities of heads 1' and 2' are made the same or alike. Sensor 161 and DPDT relay 166 enable this polarity change to occur automatically. After apparatus 80 has scooped up load 42, sensor 161 automatically causes the polarity of one of the two heads to reverse, so that heads 1' and 2' have unlike polarities, to provide positive load retention under all environmental conditions. With unlike polarities, heads 1' and 2' attract each other, providing the desired positive load retention for cargo 42. Unlike polarities for heads 1' and 2' occur when sensor's sensing range is exceeded; say that the range is 40 inches. When the distance of the sensor from the ground exceeds 40 inches, then one head changes its polarity so now heads 1' and 2' attract each other to produce positive load retention for apparatus.

However, with load 42 in place within space 167, FIG. 17, even like polarities between heads 1' and 2' should not cause separation of upper portions 35' and 37', because of the tension on cable 14 caused by load 42, when in place and suspended.

In this example, once suspended load 42, FIG. 15, exceeds 40 inches from ground surface 41, polarities of heads 1' and 2' would become unlike automatically, providing the desired positive load retention. Positive load retention would be provided for load 42 as long as ultrasonic sensor 161 and its beam source exceed the assumed 40 inches from surface 41. The near and far limits of a sensor is adjustable.

Relay 166, FIG. 24, turns "on" when detected object is within the near and far limits of the sensor; that is within assumed 4 inches and 40 inches of the surface below. Within these limits, polaritie of heads 1' and 2' become alike. At all other distances, heads 1' and 2' are of unlike polarity, unless the power source should be turned "off".

For apparatus 80, depending on the leverage, the ratio of distances from pin 10 centerline to hammerhead centerline and pin 10 centerline to bottom of apparatus 80, in FIG. 19, a hammerhead separation of 2 inches can produce an increased separation of bottom extensions of 4.6 inches for apparatus 20, FIG. 12, the separation of extension 133 and 134 would be 9.5 inches, for 2 inches separation at hammerheads.

Detailed Description of Sensors' Performance

Figure 23:
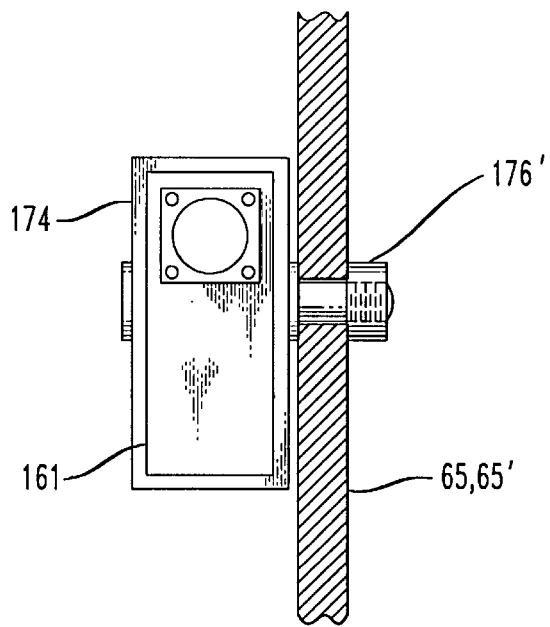
FIG. 23 shows another front view with the sensor swivelly connected to side wall of the apparatus.

It is desired to have either sensor 161 or 151 with its lens or optical window pointing directly downward, perpendicular to the surface of the object below, which would include ground 41. To provide this capability, the sensor is installed to permit its case to swivel about a line passing through its center of gravity (C.G.) FIG. 23. For better results, two sensors of one type are installed on apparatus 80; both are located centrally at the feet on extensions 53, FIG. 19, of the apparatus. Two sensors permit improved location of load 42. A single sensor would not locate the load as precisely and centrally. FIG. 20 is a bottom view of apparatus 60. In FIGS. 19, 66 and 67 are compressed air containers for inflating pillows 70 and 70'.

As apparatus 80, suspended from helicopter 60, is lowered by hoist cable 14, both sensors 161 are looking at areas directly below. Assume that the pilot has guided the helicopter directly over cargo 42, with the aid of a video monitoring system, FIG. 26, as he is lowering apparatus 80. As soon as either sensor is within range, lower portions 64 and 65 separate by virtue of electromagnets 56' and 57' having like poles. The apparatus being comparatively lightweight, it would not take more than 10 amperes of current applied to the electromagnets to accomplish this separation. With the design of swivel 177, of head assembly 179, shown in FIG. 24, each sensor, 161 or 166, has the ability to swivel and have its optical window always pointing directly downward by the force of gravity. Sensors shown at the location in FIGS. 17, 18, 19 and 20 are connected in parallel. After apparatus 80 has scooped up cargo and lifted cargo 42 beyond the range of the sensors' polarities of hammerheads 1', 2' of electromagnets 56' and 57' become unlike and attract each other.

Mechanical Features of Electromagnets

Figure 24:
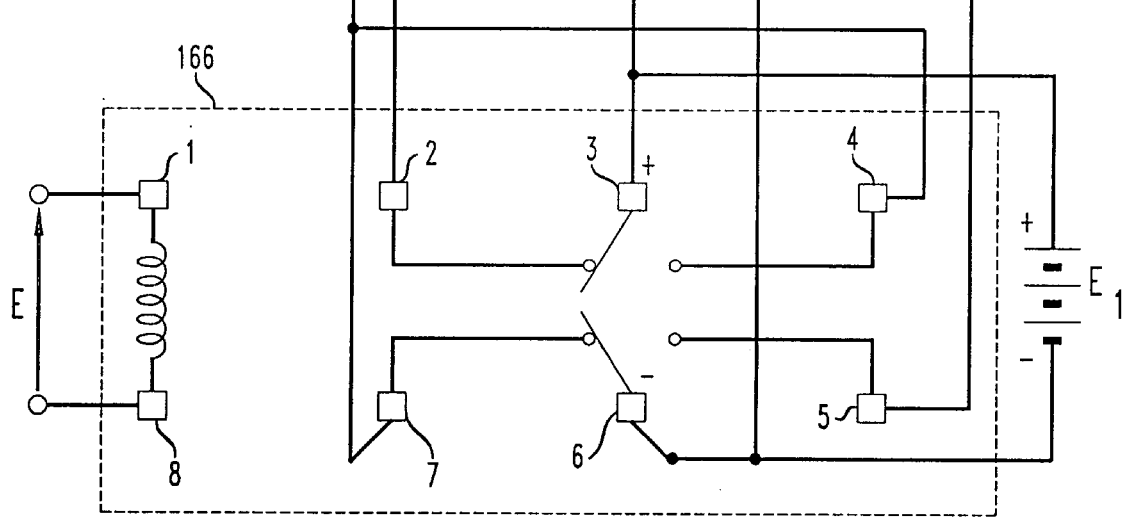
FIG. 24 shows a schematic of the DPDT relay and diagram of two electromagnets. The electromagnets are allowed to swivel about pivot pins to allow hammerheads to remain facing each other vertically, because the pin is located along a vertical line with the swivel member C, G.

FIG. 24 shows relay 166 and electromagnets 56' and 57' which provide either positive load retention by the attraction of unlike magnetic polarities heads or the separation of lower portions of apparatus 80' or 80, depending upon the polarity of the magnet's face surface. When preparing apparatus 80, FIG. 19, to scoop up a load, it is desirable to have the magnets of like polarity so lower portions of the apparatus will separate before making contact with load 42. After grabbing load, and hoisting a few feet, apparatus needs positive load retention, so relay 166 automatically makes magnets 56' and 57' of unlike polarity so they would attract and adhere to each other, while being hoisted up further by the hoisting mechanism aboard the helicopter, so load can be transported elsewhere.

Hammerheads of electromagnets, FIG. 23 are pivoted at pivot pins 177. Pins 177 are their only means of support and heads 1' and 2' hang vertically like plumb bobs along the line of their center of gravity, the center of gravity being at point 178. In this way hammerheads face each other vertically, no matter how much separated upper portions 35' and 37', FIG. 52, are from each other. Pivot pins 177 are lubricated so they swing freely.

Each hammerhead 1' and 2' is supported by a pin 177 through bars 54 and 55, respectively. Detail drawings of hammerheads are shown in FIGS. 26A, 26B and 26C. A partial top assembly view of hammerheads with bars 54 and 55 is shown in FIG. 25.

Figure 25:
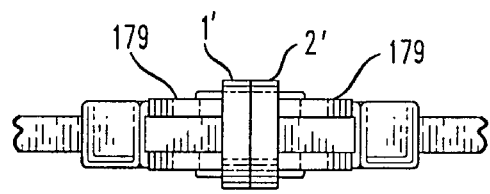
FIG. 25 is a top view of the swivelable electromagnets.
Figure 26A:
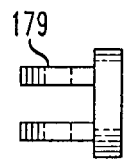
FIG. 26A is a top view of the swivable support for the electromagnet.
Figure 26B:
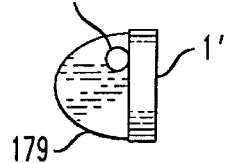
FIG. 26B is a front view thereof.
Figure 26C:
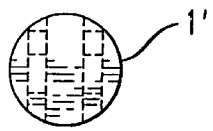
FIG. 26C is a side view thereof.

In FIG. 25 hammerheads 1' and 2' are shown attached to supports 179, which straddle bars 54 and 55, respectively. The heads 1' and 2 could be either welded to supports 179 or formed in one soft steel piece, so hammerheads can be readily magnetized, then demagnetized by dc voltage, by current reversal. Bars 54 and 55 also are formed of soft magnetizable steel. It would be desirable to make elongated structural upper portions 35' and 37', FIG. 30, of high strength metal, to enable apparatus 80 to lift heavy weights, without any bending of upper portions 35' and 37'.

Figure 28B:
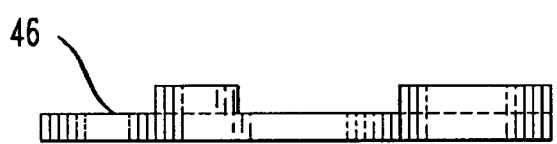
FIG. 28B is a top view thereof.
Figure 28A:
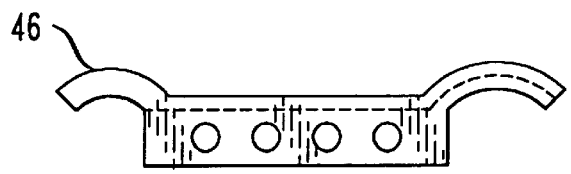
FIG. 28A is a ferrous metal reenforcement for one upper portion of apparatus in FIG. 29.

For a closed magnetic loop to occur in the upper portions of 80 for electromagnets 56' and 57', FIG. 19, soft steel plates 46 and 46', FIG. 17, are fastened to the exterior surfaces of upper portions 35' and 37', as shown in FIG. 17, apparatus 80. Front and top views of a typical plate are shown in FIGS. 28A and 28B respectively. Assuming the thickness of each upper portion to be ⅜ inch, then the flanges of 46 and 46', FIG. 29, are ⅜ inch thick to make contact with the flanges of opposing soft steel plates to enable a closed magnetic loop of soft steel to occur. Only a single plate is applied to the exterior surface of each upper portion. Hammerhead 1" includes a permanent magnet.

Bars 54 and 55, FIG. 19, have soft iron or steel surfaces and high strength metallic cores, thus allowing the passage of magnetic lines of force for a closed loop magnetic path about said upper portions, when hammerheads 1' and 2' are abutting. Also stems of hammerheads 1' and 2' would be soft steel to allow passage of magnetic lines of force.

If apparatus halves 55 and 57 are plastic, there still could be a magnetic path along the loop, indicated on FIG. 29 of apparatus 80. Ferrous metal plates shown in FIGS. 28A and 28B would be fastened to the surfaces of upper portions 55 and 57, as shown.

Description of a Preferred Embodiment Using Permanent Magnets

It is desirable to have apparatus 80', FIG. 30, perform automatic operations in order to more successfully scoop up and load 42 with less effort on the part of the helicopter co-pilot, operating the hoisting mechanism. With the aid of a CRT screen, in the cockpit, the co-pilot lowers apparatus 80' over the top of load 42. As apparatus 80' comes within a short distance of the cargo, DC motor 199 is turned on momentarily by pilot operating switch to turn on light source 197 to cause magnetic assembly 183 to rotate 180°, so that faces of magnetic assemblies 183 and 184 will repel each other, instead of attracting, to assist in apparatus' lower portions to separate so it would straddle cargo 42 on its downward travel. Upon assembly's rotation of 180°, assembly automatically stops. Light source 197 focuses on light-activated control switch circuit 198 with photo transistor 203.

Figure 32:
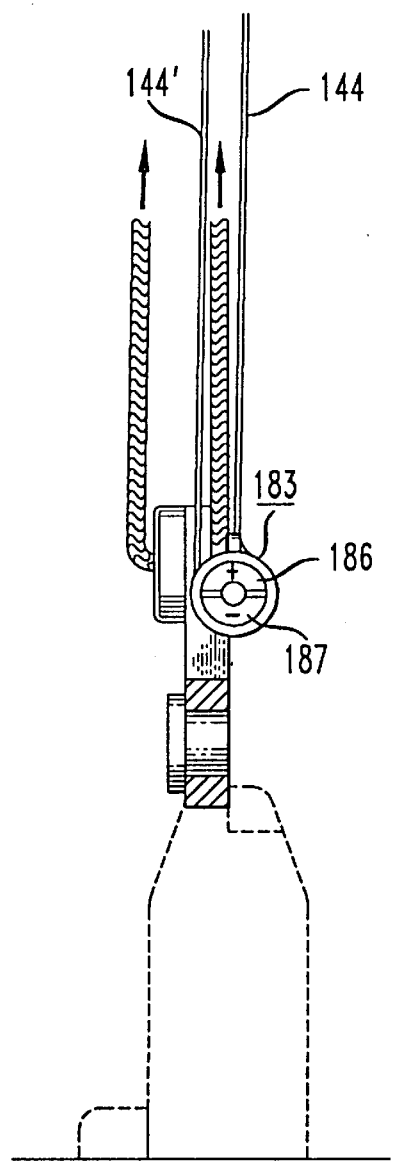
FIG. 32 is a side sectional view thereof, across line 32—32.
Figure 35:
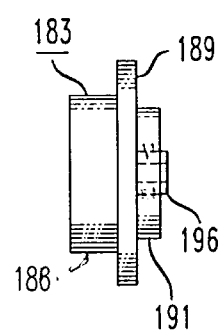
FIG. 35 is a side view thereof.
Figure 36:
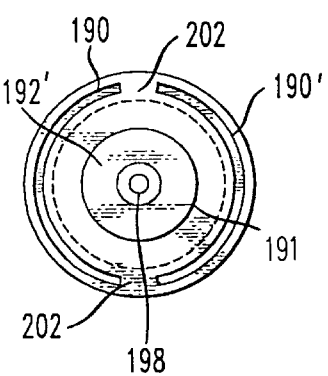
FIG. 36 is its reverse side showing semicircular indentations.

How is apparatus able to perform in this manner? Magnetic heads 183, 184, each have two semi-circular magnets 186 and 187, as shown in FIGS. 32 and 34. In one 180° position, the magnets of opposing assemblies attract each other. In its other 180° position the magnets repel each other. When apparatus 80' is within a few feet of said cargo 42, magnets are made to repel each other, so as to cause lower portions 64', 65', to separate and straddle cargo 42. This is accomplished by rotating assembly 183 an angle of 180°. FIG. 35 is a side view of FIG. 34, and FIG. 36 is a back or rear view thereof. Outer disc 189, contains circular slots 190.

As part of the magnetic assembly, 183 has slotted disk 189, FIG. 35. Semicircular slots 190 and 190' FIG. 34 permit a light beam to pass through to energize dc motor 199 to rotate approximately 180° until opaque portion 202 is reached. Motor 199 must be energized again momentarily by closing relay switch 201, FIG. 41, with reed of relay 200 in position "b" to cause it to turn another approximate 180°.

Figure 37:
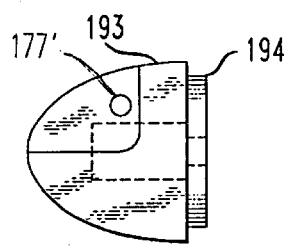
FIG. 37 is one-half of a motor and disk support with a pivot hold and recess for holding motor in position.
Figure 38:
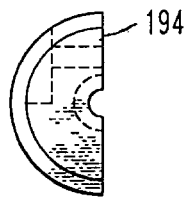
FIG. 38 is an end view thereof.
Figure 40:
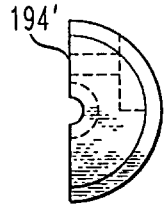
FIG. 40 is an end view thereof.
Figure 39:
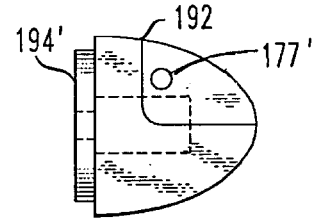

Disk 189 has flanges 191, FIG. 35, to embrace semi-circular protrusions 194 and 194' about which to rotate in 180° increments. Coupling 196, FIG. 35, engages shaft of motor 199. Bar 54', FIG. 30, sandwiches between structural halves 192, 193, shown in FIGS. 37 and 39, to support these halves, via pilot pin 177 in hole 177', FIG. 39, including motor 199 and magnetic assembly 183. Pivot pin 177 is of high strength steel to provide the support for these various pieces. Motor 199 is fastened to the two halves in the inside to help keep the two halves together while they are being pivoted above the pivoted assembly's center of gravity. Half 193, FIG. 37, has a semi-cylindrical recess to accommodate motor 199 and a hole 177' for the pivot pin. FIG. 38 is its end view. Similarly, other half 192, FIG. 39, has a semi-cylindrical recess to accommodate the motor's other half. Motor 199 is fastened to both halves by adhesive, for structural support and the halves are spaced to accommodate bar 54' FIG. 30. The assembly of halves 192, 193 and motor 199 swing freely about pin 171, FIGS. 30, 56, to allow its center of gravity to be as low as possible at all times.

Figure 31:
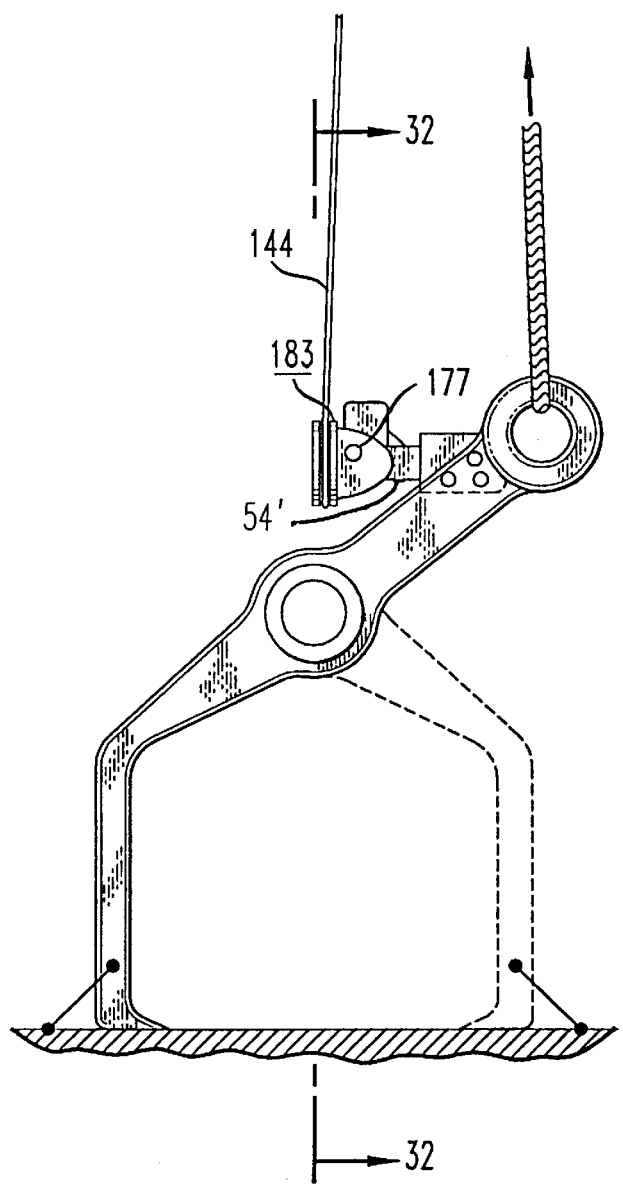
FIG. 31 is a front view of the right half of apparatus, shown in FIG. 30.
Figure 56:
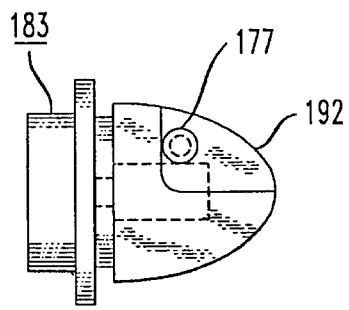
FIG. 56 is an assembly of a slotted disk attached to pivoted side supports. A bar is sandwiched inside the two supports, as shown in FIG. 30, and structurally supports the two, via the pivot pin. The view showing the slot between the side supports is shown in FIG. 33.

Other parts of opposing magnetic assemblies 183, 184, to enable the separation of apparatus' lower portions, include light-activated control switch circuit 198, light source 197, FIG. 30, the semi-circular slots 190 and 191, and pivot pin 177, FIGS. 31 and 56. Opaque portions 202 exist between slots 190, 191', to prevent light from source 197, FIG. 30, to pass through a slot and fall on light-activated control switch, causing shaft of motor 199, FIG. 41, to stop turning by removing its energy source. Control switch, when light-activated, closes switch of relay 200, FIG. 41, to apply voltage to motor 199. In case of emergency, to provide energy to motor to restart motor, manual switch 201, FIG. 41, is provided in helicopter cockpit so motor 199 can be momentarily energized remotely, so light beam can turn shaft of motor 199 for another 180° of rotation.

Pivot pins 177, FIGS. 30, 56, located above C.G. of magnetic assemblies 183, 184, respectively, enable faces of magnetic assemblies to be parallel to each other for more effective magnetic force.

Figure 41:
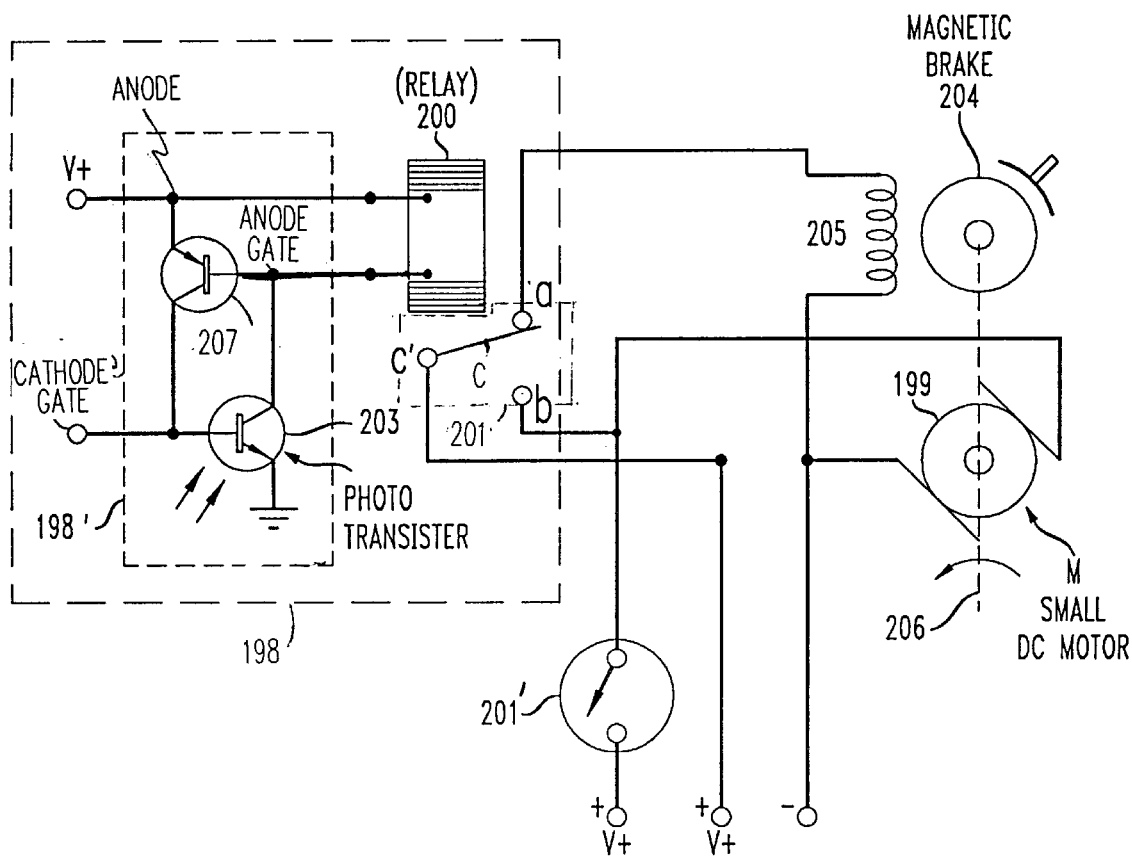
FIG. 41 is a schematic of a light-activated control switch circuit to energize a SPDT electromechanical relay.

To make sure that motor shaft 206, FIG. 41, stops at opaque portion 202 between slots 190 and 190', FIG. 36, a pulley attached to shaft with magnetic brake 204 has been added to shaft 206, FIG. 41. Now relay 200 is an SPDT device, in which in one position "a" of actuator blade "c", brake 204 is applied to shaft 206 to cause motor shaft to stop in opaque portion 202 of slotted disk 189, FIGS. 30, 35. In the other position "b" of blade "c", relay 200, voltage E+ is applied to motor 199, FIG. 41. Brake pressure on drum 204 is just sufficient to prevent motor shaft 206 from coasting beyond opaque portion 202 of slotted disk 189. To restart motor 199 so its shaft would turn another 180° to the next opaque portion, manual switch 201, FIG. 41, is closed momentarily to help overcome brake resistance. Once shaft 206 of dc motor 199 turns a few degrees and a beam of light from source 197 passes through either slot 190 or 190', then relay 200 is actuated causing blade "c" to move to position "b", disengaging brake on drum 204 FIG. 41 and enabling motor shaft 206 to turn another 180° to the next opaque portion 202 on slotted disk 189, FIG. 35. The operator of apparatus 80' has manual switch 201 in his aircraft's cockpit and decides when to have disk 189 rotated 180°. If he wants lower portions 64', 65', to separate, he has faces of magnetic assemblies 183 and 184, FIG. 30, repel each other by having like polarities face each other. If he wants positive-load-retention of cargo 42, then he has faces of magnetic assemblies attract each other by having unlike polarities face each other.

In FIG. 41, to explain the operation of light-activated control switch 198', the circuit consists of NPN photo transistor 203 and a PNP transistor 207. Switch 198' is turned "ON" by the radiation incident on transistor 203. Photo current develops a voltage across the coil of SPDT relay 200 between the anode gate and the anode, so that the anode gate becomes negative with respect to the anode, and the silicon controlled switch is turned on. By reducing the current through the device to below the holding value, the light-activated switch is turned off. Switching transistor 207 turns "ON" when the anode gate becomes negative with respect to the anode.

Figure 42:
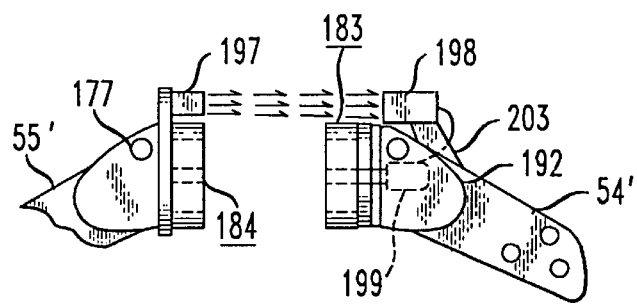
FIG. 42 is a front view of the cargo lifting apparatus, similar to FIG. 30, except that no slotted disk is required and the length of time that a light beam in ON determines the length of time voltage is applied to a dc motor to rotate a magnetic assembly 180°.

FIG. 56 is an assembly of magnetic assembly 183, support member 192 and 193 and DC motor 199. Pin 177 holds the assembly together with bar 54' sandwiched in between but not shown. FIGS. 30 and 42 show bar 54'.

Figure 21:
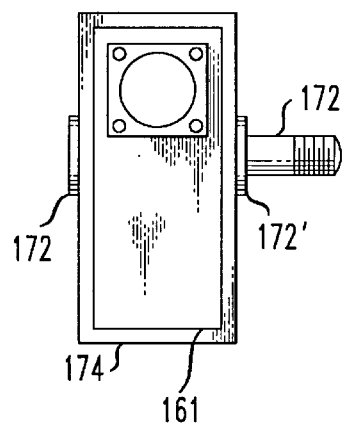
FIG. 21 shows a front view of the ultrasonic sensor.
Figure 22:
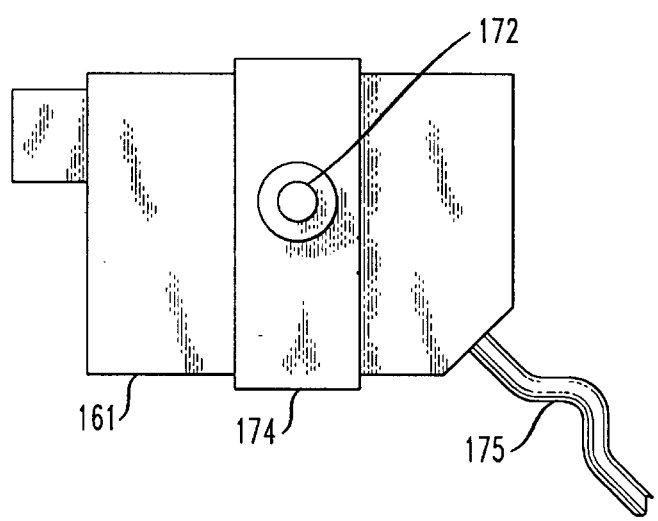
FIG. 22 shows a side view thereof.

FIGS. 21, 22, 23 show front and side views of ultrasonic sensor 161 by IDEC Corp., shown mounted on the apparatus, FIGS. 18, 19. In the front view, FIG. 21, threaded stem 172 extending from flange 172', is for mounting against the lower wall of portions 65, FIG. 19, and 65', FIG. 18, so that its lens can look down upon the view below. Stem 172 can be screwed into either side of sensor FIG. 21. A second sensor 161 may be mounted against the opposite wall, lower portions 64 and 64', FIGS. 19 and 18, respectively. Clamp 174, FIGS. 21, 22, 23 hold sensor 161 in the desired position. After stem 172 is extended into a hole in lower portion's wall lock nut 176' is screwed onto thread, holding sensor 161 in place. The sensor could be held either rigidly in place or allowed to swivel to allow it to continually point directly downward, even when lower portions 64', 65' are spread apart as in FIG. 18.

Another Preferred Embodiment

In apparatus 80, FIG. 18, hammerheads 3' and 4' could be permanent magnets 183, 184 with their outer faces of either one having like or unlike polarity. Electromagnets 56', 57' then would not be required. To save energy and reduce apparatus' complexity, in FIG. 28, permanent magnets 183 and 184 are substituted for the electromagnets 3' and 4' FIG. 18. Semi-circular magnets 186 and 187 are positioned in a cylindrical metal form, encased within the magnetic assemblies 183, 184. Assembly 183 is free to rotate about motor shaft 206. Magnets 186 and 187 may be encased in aluminum sleeves, one having a plus (+) polarity and the other a negative (−) polarity, as shown in FIG. 32.

Figure 33:
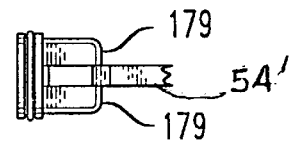
FIG. 33 is a top view of one of the pivoted hammerheads showing the top view of an enclosure containing a light-activated control switch circuit and SPDT relay.
Figure 44:
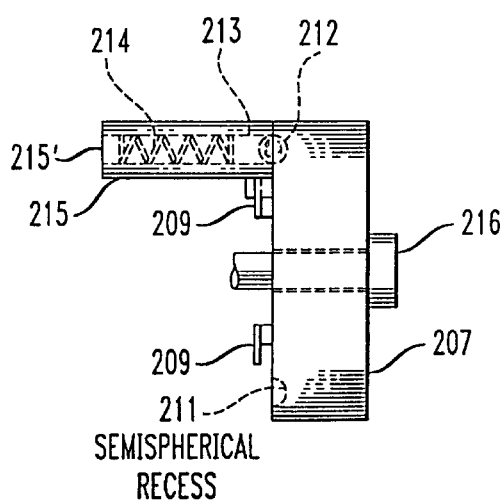
FIG. 44 is a side view thereof, showing two recesses for a lightweight spring-loaded ball bearing to engage every 180° turn of ring gear.

Magnet assembly 183 has two hemispherical recesses 180° apart on it back side, similar to cavity 211, FIG. 44. In FIG. 33, magnet support plate, 54', FIG. 44, has a spherical ball, similar to ball 212, FIG. 44, with a coil spring 214, FIG. 44, providing pressure against plunger 213, thus ball would seat in one of the two recesses 211. With plunger 212 seated in one recess, magnets 186 and 187 face like polarities of magnet assembly 184. With ball 212 seated in the other recess, magnets 186 and 187 face unlike polarities and are attracted to each other. Cord 144 is attached to the surface of assembly 183, adjacent to the recess which makes assemblies 183 and 184 repel each other. A red cord 144 is guided over a grooved surface on the cylindrical sleeve, as shown in FIG. 32. When the red cord is pulled to rotate sleeve 180° then magnets 186 and 187 face different polarities.

Another white cord 144' is also guided over the grooved surface and attached to the same location of the sleeve, but should be pulled from the other side of the grooved surface, so assembly 183 can be rotated and returned to the same position before red cord 144 was pulled.

With assemblies 183, 184, when outer faces having like polarities face each other, upper portions 35', 37' of apparatus 80 are forced to separate from each other, as shown in FIG. 18.

When lightweight apparatus 80 is being lowered to straddle load 42, upper and lower portions of apparatus need to be separated, as much as the magnets' repulsion will enable them to do so.

A two-inch separation of magnet assemblies 183 and 184 would provide at least an eleven-inch separation of hinged extensions 39, 39', FIG. 17 with extensions 39 and 39' hinged so they lift up when encountering the load beneath the separation could double to 22 inches. Additional separation could occur when the bottom of lower portions encounter load 42, to enable lower portions 64' and 65' to straddle the load. Pivot pin 10 and inflated pillows 192, 192' would allow lower portions to separate the additional amount to straddle the load.

When hinged pointed extensions 39 and 39' come back into positions, FIG. 19, by lower portions coming together, hoist cable 14 is slackened because lower portions make contact with platform or ground below, then hoist cable 14 is ready to be pulled up by winch mechanism above. Now when hoist cable is pulled, pointed extensions 39, 39', FIG. 19, slide under load 42 and grab it, because weight of load 42 would force upper portions 35', 37' to come together. At this point cord 144 is pulled upward a sufficient amount to make magnet assembly 183 to rotate 180°. Now, permanent magnets 186 and 187, FIG. 32, are facing unlike polarities and thus attract each other, helping to cause assemblies 183 and 184 to come together and promote positive load retention. The operator of winch mechanism in helicopter can now cause apparatus 80 to be raised the desired amount before travelling to another selected destination.

Figure 27:
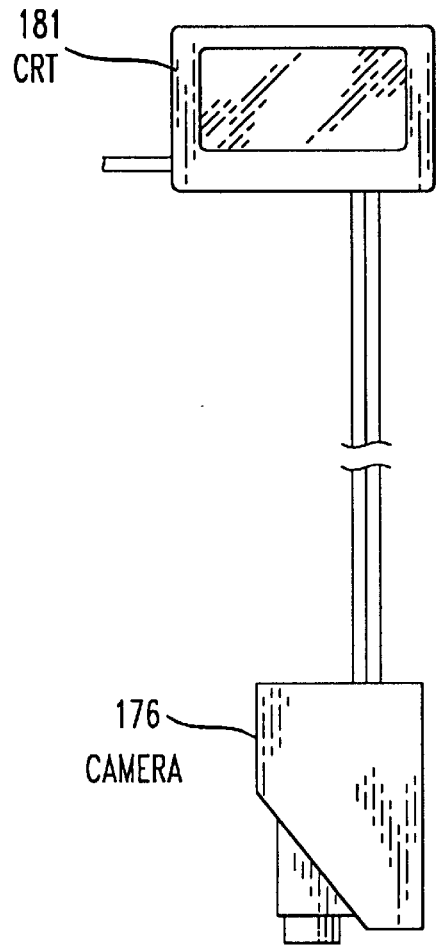
FIG. 27 shows a physical diagram of the Radio Shack miniature surveillance camera with its electrical wire tied and connected to a CRT monitor located in the helicopter cockpit.

Upon arriving at the new destination, helicopter 71 returns to the hovering mode and lowers apparatus 80 via the winch hoist mechanism. Monitor 181 in the aircraft cockpit and the surveillance camera 176, FIG. 27, mounted on apparatus 80, the pilot is able to see where cargo 42 is being unloaded. For the manual mechanical approach, while cargo 42 is still a few feet above the ground, operator of cord 144 again pulls cord 144 upward a sufficient amount to make magnet assembly 183 rotate 180°. Now, permanent magnets 186 and 187, FIG. 30, are facing like polarities, thus repelling each other, helping to cause assemblies 183 and 184 to separate from each other. As soon as the bottoms of lower portions 64' and 65' make contact with the platform below, hoist cable 14 slackens and lower and upper portions separate automatically freeing apparatus 80 from cargo 42, as shown in FIG. 18 and allowing apparatus 80 to be pulled upward by hoist cable 14. Hence, the load-scooping and releasing system of FIG. 18 is simplified as shown in FIG. 31, requiring fewer parts. In the manual approach, the parts not required are the two ultrasonic sensors 161 and the two electromagnets requiring power to energize, when required, and the power supplies to the sensors and the electromagnets.

An alternate method to rotate magnet assembly 183 one hundred eighty degrees to cause magnets 186 and 187 either to attract each other or to repel each other is described below.

Figure 43:
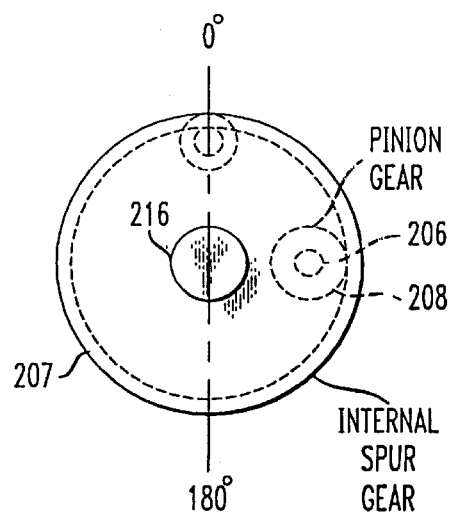
FIG. 43 is a front view of ring and pinion gears which mechanically rotate magnetic assembly 180°.

In place of the groove in magnet assembly 183, an internal ring gear 207 and pinion gear FIGS. 43, 44 are substituted. Assume it takes four revolutions of pinion 208 to traverse one revolution of internal ring gear 207, fastened or attached to assembly 183. Pinion gear, the driver, rotates about shaft 0, while gear 207, the driven, rotates about center 0'. Shaft of pinion gear 208 is coupled to the shaft of a miniature dc motor 199 and timer 210 turns "on" and "off" the dc motor. The turning "on" of motor may be performed manually from the helicopter's cockpit, but the turning "off" would be automatic, to assure that assembly 183 rotated only 180°, for the polarities of magnets 186 and 187 to either attract or repel, as desired and required. Spherical ball 212 is constrained within tube 215, and is forced against semispherical recesses 211, 180° apart, by spring 214 and plunger 213. Spring 214 is kept within tube 215 by plug 215'.

Assume 6 teeth on pinion and 24 teeth on internal ring gear to provide the 4 to 1 ratio in angular motion. Timer allows motor to run the required number of seconds for ring gear to rotate 180°, then automatically stops motor precisely when 180° rotation has occurred. The power supply and switch for motor 199 and timer 210 are located in the helicopter cockpit. The co-pilot could operate the motor by pushing a switch at the right moment either when the apparatus 80 is descending or when apparatus 80 is ascending, either to provide magnetic repulsion or to provide magnetic attraction. Ring gear 207 should be identified as an internal spur gear.

Description of Another Preferred Embodiment

Figure 46:
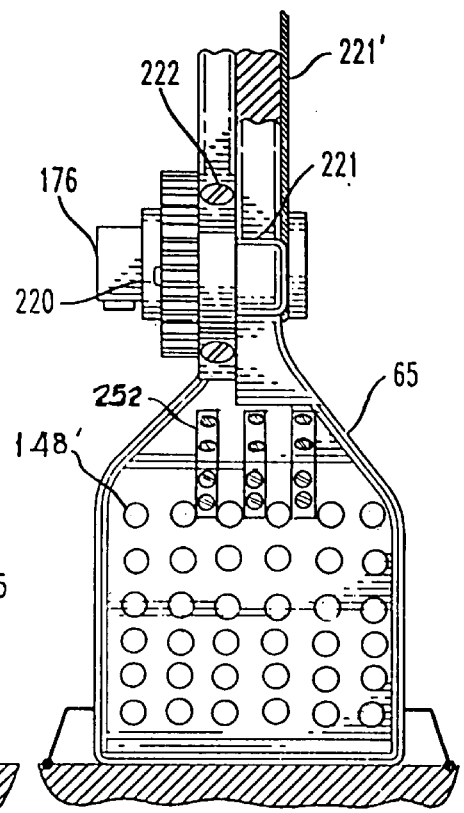
FIG. 46 is a side view thereof.

Apparatus 100, shown in FIGS. 45 and 46, would be suspended from a helicopter and designed to scoop up either a person or containerized cargo as the load, and to transport such load from one site to another preferred site. The structural design of this apparatus would be similar to those in Gabriel's previous U.S. Pat. No. 5,209,538.

This apparatus includes a surveillance camera 176, a dc motor 221, a pinion gear 218, a spur gear 217, a clutch between the pinion and spur gears.

If the apparatus is to be placed over a load 42', the pilot of the helicopter would like to know how close the apparatus is to load 42'. He is able to estimate the distance from viewing the CRT picture on the screen in his cockpit. It will take the experience of repeated operations in scooping up a load to be a good judge of when to produce separation of lower portions of 64 and 65 in order to straddle load 42' for its scooping up.

Figure 49:
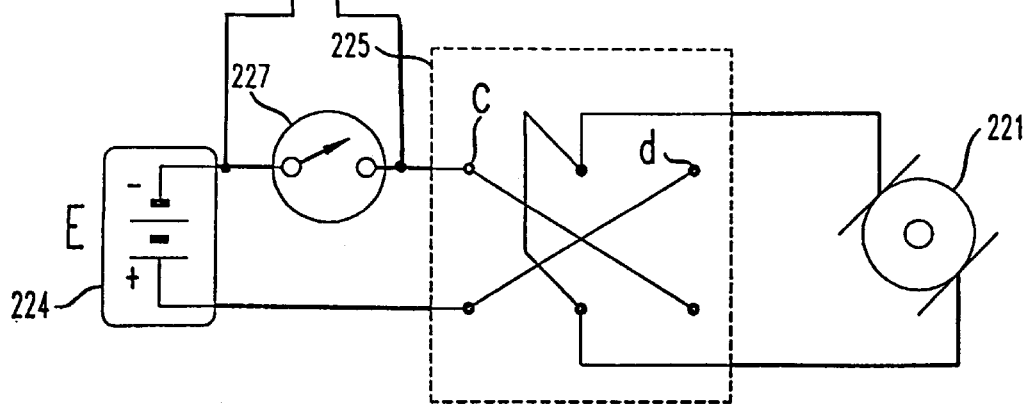
FIG. 49 is a circuit diagram of the motor, DPDT, and SPST switches and voltage supply for apparatus of FIG. 45.

To cause lower portions 64 and 65 to separate pilot must close switch 227 and be aware that closing DPDT switch 225 in the direction of "d" makes motor 221 to rotate gear 217 to produce separation of lower portions. At the proper time, the pilot closes switch 225, initially in neutral position, and observes the apparatus straddling load 42' and finally observes its bottom making contact with the platform 41 below. The pinion gear 218 strapped to leg of portion 65 by strap 219, is coupled to motor 221 via a clutch, capable of allowing pinion gear 218 to slip when the separation between lower portions reaches a maximum. At this point the pilot reverses the direction of motor rotation by throwing the handle of switch 225 in the direction of "d", causing the lower portions to come together and grab underneath load 42' with its pointed extensions 85 and 85'. Either cushions or inflated pillows 70 and 70' snugly and securely grab load 42', as well, while apparatus 100 is hoisted up in order to transport the load to a desired location. FIG. 45 shows the load grabbed by the closed lower portions, and FIG. 46 shows the apparatus' side view. These figures show only the lower portions, including pin 10. Upper portions 55, 57 are similar to apparatus shown in FIGS. 12 and 15, but without hammerhead magnets. The portions shown are modifications to apparatus 80 that have been made. FIG. 47 shows the front view of another modified apparatus, showing the location of spur rear 217, but with pinion gear 218 and motor 221 omitted. FIG. 48 shows a section of FIG. 47 along line 48—48. Lower portion 64 is fixed to pin 220 by screw 223 where shown, while lower portion 65 is allowed to rotate freely about pin 220. Friction between portions 64 and 65 at pin's hub is minimized by a thin oilite bearing between the two portions; also an oilite bearing exists between spur gear 217 and portion 65 at pin's hub. FIG. 49 shows a schematic diagram for operation of reversible dc motor 221, which includes SPST switch 227 and DPDT switch 225, both switches and the voltage supply 224 are located in the helicopter's cockpit.

FIG. 50 shows motor 221, pinion gear 218 and pinion hub 226. Sufficient friction exists between motor shaft 228 and pinion gear hole to cause spur gear 217 to rotate and separate said lower portions. When spur gear 217 can no longer rotate, shaft 228 slips inside of pinion gear hole. Pinion gear 218 is prevented from falling off shaft 228 by cap 229. When pinion gear 218 will not turn because spur gear 217 has stopped rotating, then shaft 228 will rotate slowly inside od hub 226, thus preventing damage to motor 221.

To assist the helicopter pilot in observing the position of lower portions 64 and 65 separation in FIG. 45 of apparatus 100, mechanical microswitch 230 and LED light source 231 have been added. Thus, when lower portions 64 and 65 have been separated the maximum distance, LED 231 illuminates; then motor supply voltage E may be switched off, via manual switch 227. To bring lower portions together, DPDT switch is connected or toggled in the opposite direction to reverse voltage polarity to the motor. FIG. 49 shows the circuit. After bottom of cargo 42 has made contact with platform 41, switch 227 is closed and DPDT 225, FIG. 49, is toggled to reverse motor 221 rotation, bringing lower portions together, thus grabbing underneath said cargo with their pointed protrusions 85 and 85', FIG. 47; thus to enable cargo 42' to be hoisted.

In regard to the location of push button switch 230 and top of recess 12, FIGS. 45 and 47, it should be explained that there are two such recesses, one in front of assembly 100 and one in rear of this assembly. Upper portion 57 would rest on protrusion or projecting extension 12, FIG. 47, normally, and upper portion 55 would rest on a similar protrusion or recess in upper part of lower portion 65. In this apparatus both recesses will not provide support for both upper portions 55 and 57 when lower portions 64 and 65 are completely spread apart. In this particular design, only the upper part of portion 65, not shown, will provide the structural support, while recess 12, shown in FIG. 47, will allow upper portion 57 only to depress push-button switch sufficiently to close switch 230, FIG. 51, enabling LED 231 to illuminate, notifying pilot of maximum spread of lower portions.

In FIG. 41, brake unit 204 and DC motor 199 are shown separate. They could be integrated into one unit. Dings of Milwaukee, Wis., provides combination motor and brake units of various sizes. For small motors, brake series 40 having ⅜ to ¾ Lb-ft torque are available.

In FIG. 41, instead of phototransistor circuit 198', a photodiode circuit may be substituted to turn light into the desired voltage output. An integrated photodiode and voltage amplifier circuit in a TO-99 can has been developed by Burr-Brown Corp. as OPT 301. It has a full scale output voltage of 10 V, DC.

An alternative approach to having DC motor 199 start and stop, when desired, is to have a laser beam from 197, FIG. 30, provide illumination, via a manual switch, incident on phototransistor control circuit, FIG. 41, to start DC motor 199 and cause its shaft to turn 180°, in order to change the polarity of assembly 183, facing magnetic assembly 184 of the opposing hammerhead. Thus, the two hammerheads may either attract one another or repel each other, as desired. In this approach, motor 199 will not stop automatically. The operator needs to switch off light source 197, unless a short duration electronic timer 210 will shut off the light source automatically. The same relay 200, magnetic brake 204 and motor 199 would be required, but slotted disk 189 would not be. FIG. 42 shows the upper portion of apparatus 90 without slotted outer disk 189

Referring to FIG. 42, the hardware for magnetic assemblies 183 and 184 is available off-the-shelf from Bunting Magnetics Co., Newton, Kans. Now using Bunting's part No. BM1914, FIGS. 52 to 55 were drawn, the magnetic assembly being identified as 232. Magnetic assemblies 232 and 232' come in lengths or depths of ½ to 1½ inches to provide holding forces of 10 to 45 Lbs, respectively.

Figure 54:
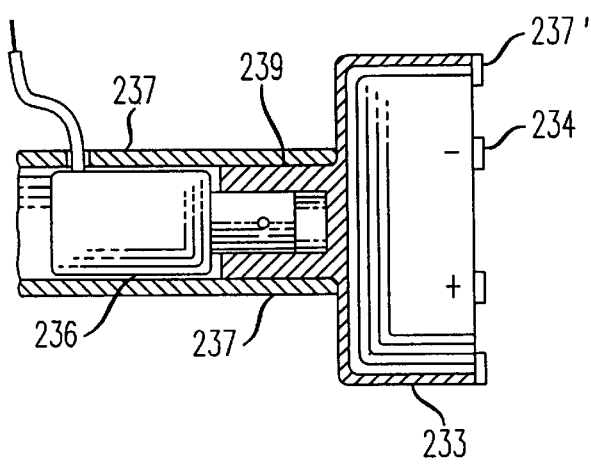
FIG. 54 is a section along line 54—54 of FIG. 52 including the motor with its shaft attached to the hub of the magnet assembly.
Figure 55:
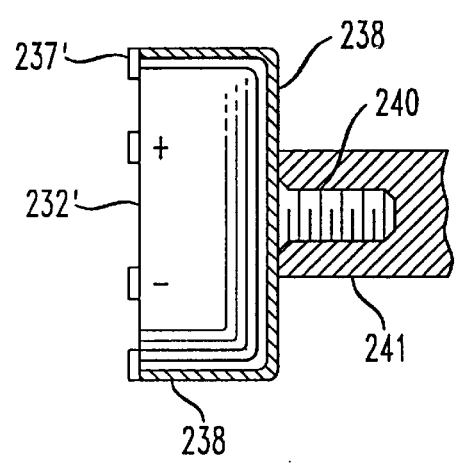
FIG. 55 is a section along line 55—55 of FIG. 53 showing the stud of a magnet assembly screwed into a horizontal bar, a part of the apparatus' upper portion.

FIG. 52 shows the front view of one magnetic assembly with protruded poles 234 and 235. FIG. 54 shows assembly 232 and enclosure 233, which is rotatable by dc motor 236. Its shaft is fastened to hub 239 of enclosure 233. Motor 236 is fastened to the inside of hollow member 237. The pivoted portion of the structure has been omitted, being described elsewhere. The technique for rotating enclosure 233, FIG. 54, in increments of 180°, would be the same as described for FIG. 42. FIG. 55 shows the opposing magnetic assembly 232' fastened to stationary enclosure 238, which has a threaded stud 240 screwed into bar 241. In the position shown of magnetic assembly 232, FIG. 54, pole pieces 234 and 235 attract the pole pieces of opposing magnetic assembly, FIG. 55. When assembly 233, FIG. 54, is rotated 180° by motor 236, the polarities of its pole pieces facing assembly 232' are reversed, so now magnetic assembly 232 is repelled by assembly 232', desirable when apparatus 80 is positioned to scoop up load 42. Magnets 234, 235, in Bunting magnetic assemblies 232 and 232', are permanent.

It may be desirable to provide an alternate method of controlling the operation of DC motor 221 than using the voltage supply line 221' from the aircraft. Radio wave transmission may be provided from a transmitter 253 in the cockpit to the receiver 254 on the apparatus. This approach would require a battery on the apparatus to provide power both for the receiver and the DC motor 221. To assist one in visualizing the suggested operation, consider a remote-controlled toy auto, sold at Radio Shack stores, the radio waves emit from a hand-held radio transmitter, transmitting the desired signal to a tiny receiver within the frame of a toy car. The transmitter input signal can cause the car to go either forward or backward, depending on its polarity. Similarly, the transmitter in the pilot's cockpit can cause motor 221 to rotate forward or in reverse, as well as stop motor rotation.

Figure 57:
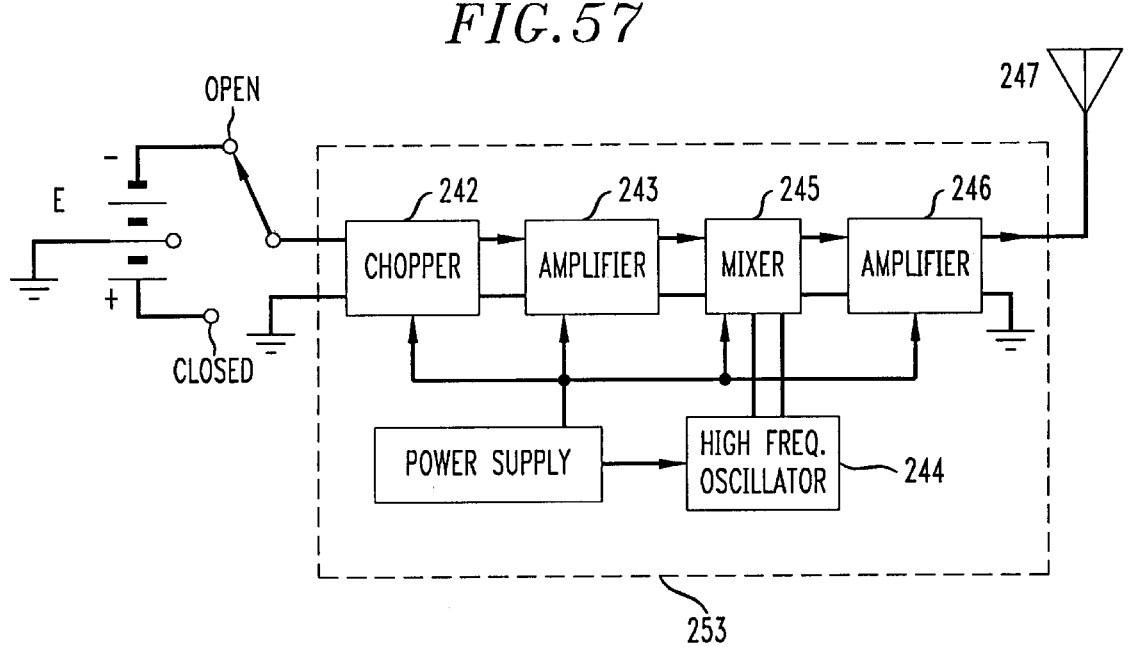
FIG. 57 is a remote hand-held transmitter, block diagram for controlling the opening and closing of the two lower portions of the apparatus, FIGS. 45 and 46.
Figure 58:
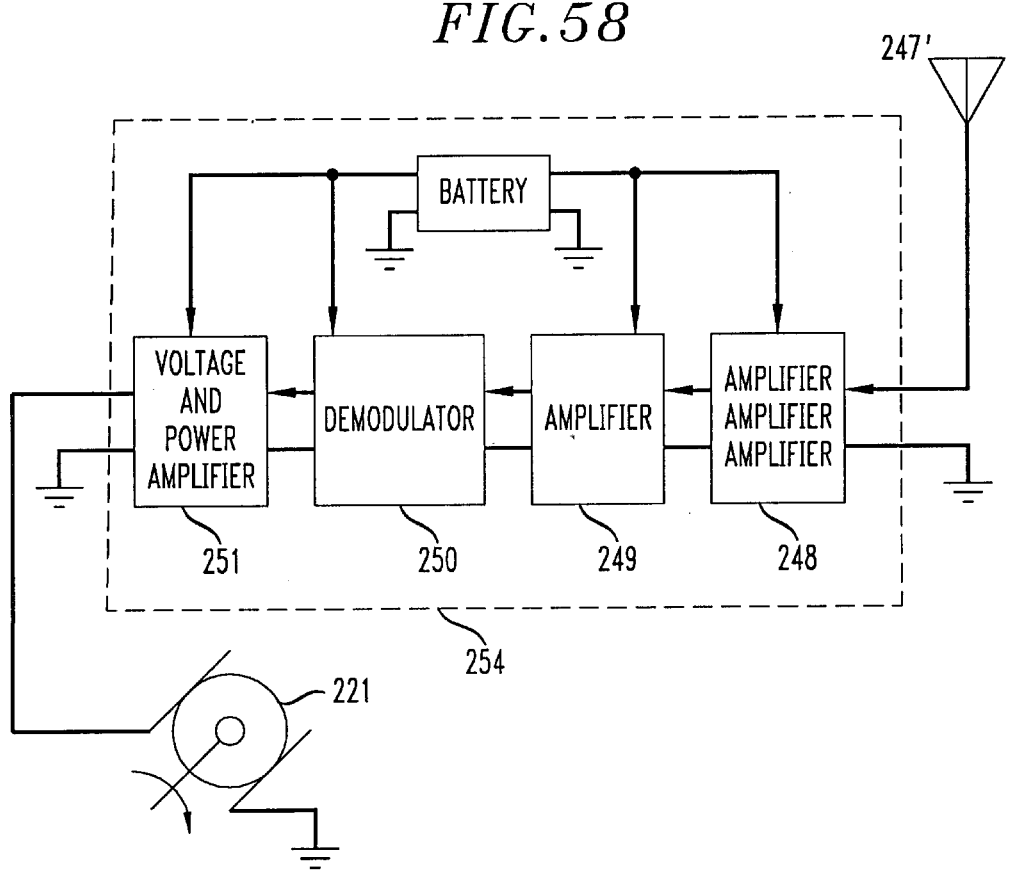
FIG. 58 is a receiver block diagram for the radio waves from the transmitter, located on apparatus, FIGS. 45 and 46, to actuate motor.

FIG. 57 shows a suggested block diagram for transmitter 253 in the cockpit and receiver 254 on apparatus 100. DC voltage E provides either plus or negative signals to signal chopper 242, amplified by amplifier 243, mixed with high frequency provided by HF oscillator 244, via mixer 245. The signal may be again amplified by amplifier 246 before being applied to antenna 247. Receiving antenna 247' on apparatus receives the HF signal. First detector stage, FIG. 58, removes the carrier frequency, then amplifier 249 amplifies the signal. A second detector or demodulator stage 250 may be used to further remove any remaining carrier frequency. The clean signal is finally voltage- and power-amplified by amplifier 251 and applied to DC motor 221, FIG. 58. As a suggestion, the above radio-controlled system may be used as an independent back-up for the wired motor 221 from the aircraft cockpit to the apparatus. Digital signal transmission would be preferred, being much less sensitive to extraneous signals. Then the receiver 254 would receive digital pulse signals. A digital-to-analog converter would be needed if the remaining blocks are of analog nature.

All apparatuses have perforations or apartures for either air or water to pass through. These perforations reduce the resistance to fluid flow, allowing the snatched parson to breathe easily and in addition they reduce the apparatus' weight. Figures having perforations are the following: 12, 16, 17, 18, 19, 29, 30, 31, 46, 47, 48. Cushions are attached along the lengths of the inside wall surfaces of the apparatus' lower portions. These cushions have perforations or apertures, too, selectively positioned therethrough. A selectively number of these through apertures are arrayed with substantial alignment with a plurality of venting apertures for allowing air to pass through from the apparatus' exterior to its interior.

Every lower portion has a knee that does not bend. This knee is formed at the junction between the lower and upper portions of the apparatus. Apparatus' upper portions have considerably less width than the wide portions below the main pivot pin, shown in all assembled apparatuses. The insides of the lower portions may be curved to enable these portions to hold in place a load more securely without any damage to it.

Regarding the knee that is formed by an upper portion transforming into the wider width of a lower portion, this knee is placed under considerable stress when the apparatus supports a load. Therefore, all knees are reinforced with brackets, bent to follow the knees' contours. These are flat brackets with holes and are placed along both the inside and exterior surfaces of all knees. Machine screws pass through holes in both the inside and exterior brackets, with the holes aligned so that a machine screw passes from an outside bracket hole to an aligned inside bracket hole; a lock washer and nut keep the screw intact, without coming out under vibrational conditions. The above brackets are identified by the numeral 252 on the drawings.

I claim:

1. A lightweight load-lifting apparatus for suspension from a helicopter, in the hover mode, for accommodating a load, such as a person, an inanimate cargo having a surface, and the like, consisting of two elongated halves each with an unbendable knee, each elongated half being held together by a main pivot pin, each elongated half including an upper portion and a lower portion, said knee existing in said lower portion, each upper portion being configured for use with at least one hoist cable; the lower portion of each elongated half having an inwardly projecting extension at its bottom, each inwardly projecting extension having an end, and each elongated half having an inside wall surface; at least one cushion being attached along each of said inside wall surface; each said upper portion having a bar inwardly extending from an inside surface, each bar having a hammerhead, with a face, extending toward the other, the hammerheads when abutting, receiving the major structural compressive stresses imposed by the horizontal components of said hoist cables, when supporting said cargo; a remotely-controlled means for selectively controlling the lower portions of said halves between a closed position and a fully spread apart position; securing means for helping to keep said load in place on each of said extension, thus helping to provide positive secure retention, for the load being either retrieved or rescued; each said upper portion having a weight on top, and each said upper portion having considerably less width than said lower portion, each said weight assisting in said lower portion's separation at said apparatus' touchdown; the improvement being that each hammerhead includes a face which swivels about a pivot pin automatically by the force of gravity, such that no matter what the separation between the upper portions, the hammerhead face is always perpendicular to the horizontal, in order that the two faces of the hammerheads have a maximum attraction or repulsion to each other, said repulsion needed to separate the lower portions as much as possible when about to scoop up a load.

2. An automatically-actuated, load-lifting apparatus, as recited in claim 1, and wherein the lower portions include at least one analog signal distance sensor, projecting a beam from an infrared LED through a projection lens to said cargo's surface, said sensor for enabling the pilot of said helicopter to be informed, via a remote distance indicating meter, of the distance of said apparatus from said cargo's surface.

3. An automatically-actuated weight lifting apparatus, as recited in claim 1, wherein the lower portions include at least one ultrasonic distance sensor emitting sound waves from an ultrasonic oscillator of said sensor, said sound waves being reflected from said load to the receiver of said sensor, thus determining the presence of the load.

4. An automatically-actuated weight lifting apparatus in accordance with claim 1, wherein said lower portions include having a miniature surveillance camera positioned to provide images of the surface below, for sending said images seen by said camera, to a monitor in the pilots cockpit to assist the pilot in finding the load, said surface being either solid or water.

5. An automatically-actuated weight lifting apparatus, in accordance with claim 1, wherein the remotely controlled means enables an electromagnet on at least one said bar to force the separation of the upper portions.

6. An automatically-actuated lifting apparatus, as recited in claim 5, wherein the upper portions provide means for providing a closed magnetic circuit when the hammerheads are abutting; said means being bars, each of said bars having a hammerhead at one end, one of said bars having an electromagnet, each said hammerhead having a mild steel core and magnetizable ferrous plates being attached to said bars including the hub of said pivot pin to enable said closed magnetic circuit to be realized.

7. An automatically-actuated, weight-lifting apparatus in accordance with claim 1, wherein said securing means includes a top surface to the inwardly projecting extension said surface being of resilient friction material for supplemental load retention.

8. An automatically-actuated apparatus in accordance with claim 5 and wherein each hammerhead having one or more magnets; so when said hammerheads of like polarities of magnets face each other, a repulsive force is produced causing said hammerheads to move away from each other, for separating said lower halves; then remote means being provided for reversing the polarity of the face of one hammerhead to cause said hammerheads to attract each other, for positive secure load retention.

9. An automatically-actuated apparatus, in accordance with claim 1, wherein to assist said projecting extensions to grab underneath said cargo, the end of each said extension having at least one permanent magnet imbedded and said cargo having a ferrous metal bottom, recessed along the edges of said cargo, allowing said end to get underneath of said cargo and thus encouraged to remain there because of magnetic attraction, thus providing additional secure positive load retention of said cargo, while said cargo is hoisted upward by said hoist cables.

10. An automatically-actuated apparatus in accordance with claim 8, wherein the improvement to said upper portions includes an means for rotating one of said magnetic assemblies 180°, and wherein each hammerhead contains two semi-circular, disk-shaped, permanent magnets, said semi-circular magnets being positioned adjacent to each other, with a non-magnetic strip in between, one of said magnets having a plus polarity and the other having a negative polarity at its face, one of said hammerheads capable of rotating in 180° intervals so that in one interval, said hammerheads attract each other to provide engagement of the lower portions and in the next interval said heads repel each other, to provide separation of said lower portions; the alternate means for rotation being a groove in said rotatable hammerhead with a cord attached; pulling said cord a predetermined amount causes said rotatable hammerhead to rotate 180°; said groove having a rough surface to provide the needed friction between said cord and said groove.

11. An automatically-actuated apparatus, in accordance with claim 1, capable of scooping up the load, said load being containerized cargo, said load resting on a supporting platform; each said bar having an attached hammerhead with a permanent magnetic assembly with a face at its inwardly facing end, said magnetic means being two magnetic assemblies each assembly having a plus and a negative polarity magnet, and the lower portions having extended projecting extensions with selectively sharp ends at their bottoms, extending a selected distance toward the apparatus' horizontal center, wherein the improvement to said upper portions include means for rotating a first of said magnetic assemblies 180°, said means for rotating including a miniature dc motor with a shaft, a light-activated control switch circuit and a slotted disk with opaque portions between semi-circular slots behind and above said first of the magnetic assemblies, with its semi-circular slots exposed to said switch circuit light; a second of the magnetic assemblies being non-rotatable, and having a light source mounted in front of said second of the magnetic assemblies; when said light source passes through one of said semi-circular slots and falls on said light-activated circuit, the shaft of the dc motor rotates the first of the magnetic assemblies 180° in a selected direction; when said opaque portion between the semi-circular slots prevents light from passing through said disk, said motor stops rotating with said first of the magnetic assemblies having been rotated 180°, causing the faces of said assemblies to magnetically attract each other while said apparatus is being lowered from a helicopter when said motor is energized a second time, causing said first assembly to rotate another 180°, the face of said assemblies now repel each other, thus separating said lower portions in order to scoop up said load; when a load has been straddled, said motor is energized a third time, the faces of said assemblies attract each other magnetically, thereby automatically scooping up said load without the aid of ground personnel assisting in the loading operation.

12. An automatically-actuated apparatus in accordance with claim 11, wherein a timer is used to measure the time for said shaft of said motor to rotate 180°, so that either like polarities of magnets face each other for repulsion or unlike polarities face each other for attraction of said hammerheads.

13. An automatically-actuated, lightweight apparatus in accordance with claim 11, wherein a magnetic braking means for stopping said motor at a selected position, coupled to the shaft of said motor, activated by a relay to close the circuit for said braking means, is added; said breaking means instantly stopping said motor shaft rotation, at the desired 180° magnetic assembly position, for having the desired polarity magnets facing each other.

14. A remotely-actuated apparatus in accordance with claim 1, and wherein the improvement to said apparatus' performance includes having a large spur gear centrally fastened to said main pivot pin at one of its exterior surfaces, a pinion gear on the shaft of a reversible dc motor, fastened to one of said lower portions exterior shoulder surfaces and properly meshing with said spur gear, said motor operated from a dc power source in said helicopter's cockpit, when said motor being turned on by a DPDT switch, causing said lower portions to separate when said switch is in one position and to come together when said switch is in the other position. DPDT=Double pole, double throw.

15. A remotely-actuated, apparatus in accordance with claim 14, wherein said motor and said pinion gear includes an overload clutch in between for protecting said motor from overheating, should said motor continue to be energized after apparatus' lower portions have been completely spread apart, said motor's shaft being permitted to turn inside said pinion gear.

16. A remotely-actuated apparatus in accordance with claim 14, wherein a limit switch is introduced to open said dc motor's circuit, so said motor would stop operating when said switch is pressed; another pressure switch located adjacent to said limit switch, when pressed by upper portion of said apparatus closing an LED illumination circuit to indicate to the pilot of a helicopter that maximum opening of said lower portions has occurred, and that said apparatus is ready to straddle said load upon lowering of the spread-apart lower portions.

17. A remotely-actuated apparatus, in accordance with claim 14, wherein said dc motor's operation is controlled by a hand-held radio transmitter, held by a person in said helicopter for opening and closing said apparatus' lower portions, said transmitter transmitting a signal to receiver on said apparatus; a power source being provided aboard said apparatus, whereby said motor's operation would no longer be dependent on wires running from said helicopter to said apparatus, wires that could be severed; said transmitter including amplifiers, a signal mixer, a high frequency oscillator and antenna, said receiver having a detector, signal amplifier, demodulator and power amplifier components, all in sequence, to provide the required electrical voltage.

18. A remotely-actuated apparatus in accordance with claim 14, wherein said projecting extensions are flexible, slippery plastic material at the bottom of said apparatus' lower portions, said extensions having ribs underneath for providing a little stiffness and ease in sliding underneath a load, such as a prone-positioned person being scooped up and rescued, said ends of said extensions being dull and slippery so as not to any way injure said person, the rescuing being made without the need of ground personnel for assistance in the rescue effort.

* * * * *